(12) United States Patent
Toshioka et al.

(10) Patent No.: US 7,891,172 B2
(45) Date of Patent: Feb. 22, 2011

(54) PURIFICATION CAPACITY RECOVERY METHOD OF EXHAUST GAS EMISSION CONTROL SYSTEM

(75) Inventors: Shunsuke Toshioka, Numazu (JP); Kuniaki Niimi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1011 days.

(21) Appl. No.: 11/629,668

(22) PCT Filed: Jun. 23, 2005

(86) PCT No.: PCT/IB2005/001782

§ 371 (c)(1),
(2), (4) Date: Dec. 15, 2006

(87) PCT Pub. No.: WO2006/000892

PCT Pub. Date: Jan. 5, 2006

(65) Prior Publication Data

US 2008/0092528 A1 Apr. 24, 2008

(30) Foreign Application Priority Data

Jun. 24, 2004 (JP) ............................. 2004-186782
Jan. 17, 2005 (JP) ............................. 2005-008991

(51) Int. Cl.
*F01N 3/00* (2006.01)
(52) U.S. Cl. .................. 60/286; 60/305; 60/287; 60/293; 60/295; 60/296
(58) Field of Classification Search .................. 60/274, 60/284–287, 289, 292, 295, 299, 301, 305
See application file for complete search history.

(56) References Cited

U.S. PATENT DOCUMENTS

| 5,406,790 | A  | * | 4/1995 | Hirota et al. ................... 60/276 |
| 6,233,925 | B1 |   | 5/2001 | Hirota et al. |
| 6,679,052 | B2 |   | 1/2004 | Nakatani et al. |
| 2003/0106306 | A1 | * | 6/2003 | Nakatani et al. .............. 60/288 |
| 2004/0003588 | A1 |   | 1/2004 | Nakatani et al. |
| 2004/0011026 | A1 |   | 1/2004 | Nakatani |

FOREIGN PATENT DOCUMENTS

| EP | 0 984 146 A2 | 3/2000 |
| EP | 1 055 806 A2 | 11/2000 |
| JP | A 2002-038939 | 2/2002 |
| JP | A 2003-074327 | 3/2003 |

(Continued)

OTHER PUBLICATIONS

Nov. 2, 2010 Office Action in Japanese Application No. 2005-008991, with translation.

*Primary Examiner*—Thomas E Denion
*Assistant Examiner*—Jesse Bogue
(74) *Attorney, Agent, or Firm*—Oliff & Berridge, PLC

(57) ABSTRACT

When a fuel as a reducing agent is supplied to a NOx catalyst on which a NOx or a SOx is reduced, a flow rate of exhaust gas that flows through an exhaust passage is changed, and the fuel is supplied to the exhaust gas flowing through the exhaust passage at a plurality of timings ($\Delta T1$, $\Delta T2$) when the exhaust gas flows at different flow rates.

22 Claims, 8 Drawing Sheets

FOREIGN PATENT DOCUMENTS

| | | |
|---|---|---|
| JP | A 2003-074328 | 3/2003 |
| JP | A-2003-176715 | 6/2003 |
| JP | A 2003-214150 | 7/2003 |
| JP | A-2004-36450 | 2/2004 |
| JP | A 2004-052603 | 2/2004 |
| JP | A-2004-68700 | 3/2004 |

\* cited by examiner

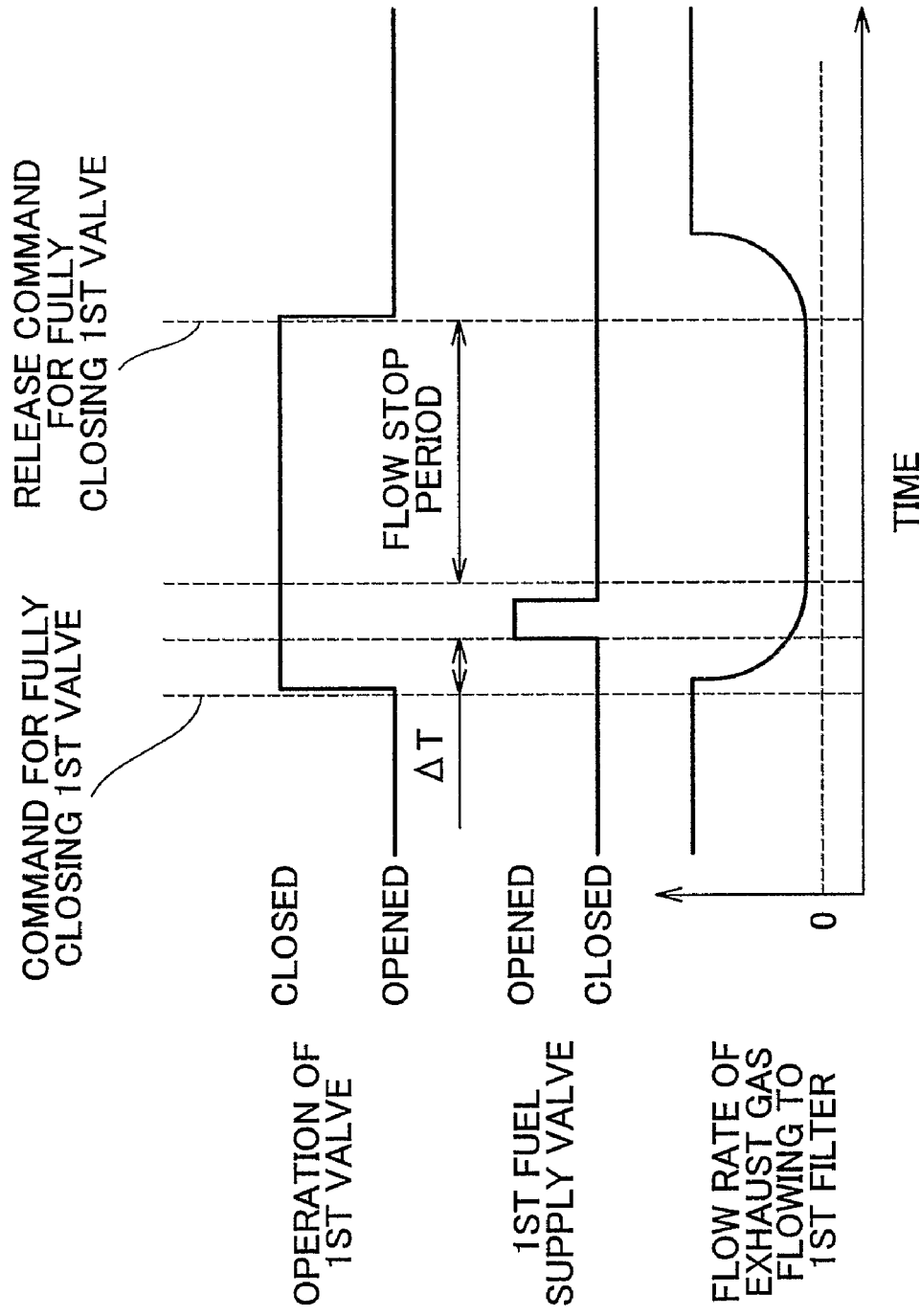

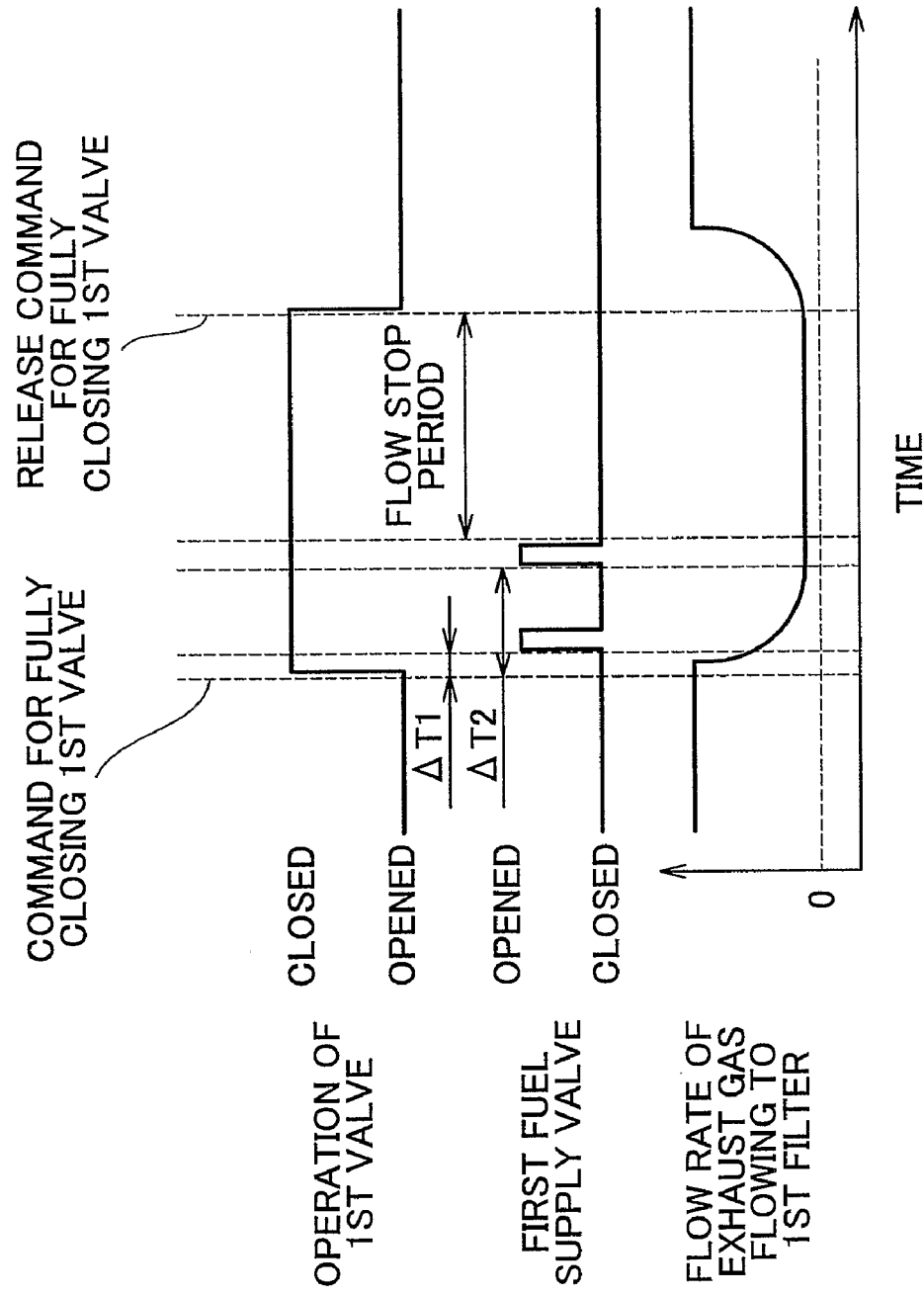

PURIFICATION CAPACITY RECOVERY METHOD OF EXHAUST GAS EMISSION CONTROL SYSTEM

BACKGROUND OF THE INVENTION

1. Field of Invention

The invention relates to an exhaust gas emission control system of an internal combustion engine and a purification capacity recovery method of the exhaust gas emission control system.

2. Description of Related Art

Exhaust gas discharged from an internal combustion engine contains harmful substance, that is, NOx. Generally an NOx catalyst is provided in an exhaust system of the engine. In the case where an occlusion/reduction type NOx catalyst is employed, the more the occluded amount of the NOx increases, the less the exhaust gas purifying capacity of the NOx catalyst becomes. For this, a fuel functioning as a reducing agent is supplied to the occlusion/reduction type NOx catalyst so as to release the NOx that has been occluded in the NOx catalyst through reduction. The aforementioned method will be referred to as "NOx reducing method" hereinafter. It is well known that as the NOx catalyst occludes SOx contained in the exhaust gas, it may suffer an S-poisoning, resulting in the deteriorated exhaust gas purification capacity. The fuel functioning as the reducing agent is supplied to the NOx catalyst so as to eliminate the S-poisoning. The aforementioned method will be referred to as "S-poisoning eliminating method" hereinafter.

If the flow rate of the exhaust gas introduced to the NOx catalyst is not appropriate upon supply of the fuel as the reducing agent thereto, there may be the case that a part of the supplied fuel cannot be sufficiently used for oxidation on the NOx catalyst. This may fail to perform the NOx reducing method and the S-poisoning eliminating method (hereinafter collectively referred to as NOx catalyst recovery method), or deteriorate the fuel efficiency.

A publication of JP-A-2003-74328 discloses the art for efficiently using the fuel supplied as the reducing agent for the NOx catalyst recovery method, in which two NOx catalysts are provided in an exhaust emission control system (including exhaust catalytic system such as a NOx catalyst, and the control system therefor), and the flow rate of the exhaust gas that flows through one of those two NOx catalysts is controlled to a predetermined value by a valve capable of changing the cross section area of the exhaust passage so as to supply the fuel as the reducing agent to the NOx catalyst in the passage at which the flow rate of the exhaust gas is controlled. The thus supplied fuel may be efficiently used under the NOx catalyst recovery method.

In the aforementioned art, however, all the amount of the fuel functioning as the reducing agent cannot be fed to the NOx catalyst including its downstream portion. This makes it difficult to perform the NOx catalyst recovery method efficiently, especially when the NOx catalyst is substantially long in the flow direction of the exhaust gas, or a plurality of NOx catalysts are provided in series.

SUMMARY OF THE INVENTION

It is an object of the invention to provide an exhaust emission control system provided with an NOx catalyst, in which a NOx reducing method or an S-poisoning eliminating method may be efficiently performed.

In the exhaust emission control system according to an aspect of the invention, the flow rate of the exhaust gas flowing through the exhaust passage is changed so as to supply the reducing agent to the exhaust gas flowing through the exhaust passage at timings when the exhaust gas flows at different flow rates for reducing a NOx or a SOx on the NOx catalyst to which the reducing agent is supplied.

More specifically in an exhaust emission control system of an internal combustion engine of an aspect of the invention, which includes an exhaust passage having one end connected to the internal combustion engine, through which exhaust gas discharged from the internal combustion engine flows, an exhaust gas flow control unit that controls a flow rate of the exhaust gas that flows through the exhaust passage, a NOx catalyst provided in the exhaust passage for purifying a NOx contained in the exhaust gas, and a reducing agent supply means for supplying a reducing agent to the exhaust gas that flows through the exhaust passage by at least one discharging operation of the reducing agent under a rich spike control in which an air/fuel ratio of the exhaust gas is temporarily brought into a rich state, the exhaust gas flow control unit changes the flow rate of the exhaust gas that flows through the exhaust passage when the reducing agent is supplied to the NOx catalyst on which one of the NOx and a SOx is reduced. Then the reducing agent is supplied from the reducing agent supply means at a plurality of timings at which the exhaust gas flows at different flow rates during the change in the flow rate of the exhaust gas.

In the case where the reducing agent is supplied to the NOx catalyst provided in the exhaust passage, a part of the reducing agent that has been supplied from the reducing agent supply means may be oxidized in contact with the exhaust gas. Such reducing agent, thus, cannot be used for the NOx catalyst recovery method. The higher the flow rate of the exhaust gas in the exhaust passage becomes, the more the ratio of the reducing agent that cannot be used for the NOx catalyst recovery method to the amount of the reducing agent supplied from the reducing agent supply means increases. It is, thus, preferable to decrease the flow rate of the exhaust gas flowing through the exhaust passage so as to improve the fuel efficiency under the NOx catalyst recovery method.

The reducing agent supplied from the reducing agent supply means may be carried by the exhaust gas at the flow rate high enough to distribute the reducing agent to the downstream side of the NOx catalyst. If the flow rate of the exhaust gas flowing through the exhaust passage is low, the reducing agent supplied from the reducing agent supply means cannot be distributed over a whole area of the NOx catalyst.

According to the aspect of the invention, the flow rate of the exhaust gas flowing through the exhaust passage is changed by the exhaust gas flow control unit when the NOx or the SOx is reduced on the NOx catalyst to which the reducing agent is supplied. The reducing agent is supplied from the reducing agent supply means to the exhaust gas at a plurality of timings when the exhaust gas flows at different flow rates while being changed.

This makes it possible to supply the reducing agent to the exhaust gas in a plurality of states of the exhaust gas at different flow rates in the exhaust passage, preventing the reducing agent from being unevenly distributed to a specific portion of the NOx catalyst. Accordingly the reducing agent can be evenly distributed over the whole area of the NOx catalyst.

The reducing agent discharging operation represents the operation of discharging the fuel from the reducing agent supply means, which includes the fuel injection from the reducing agent supply means.

In the above-structured system, a timing for supplying the reducing agent from the reducing agent supply means may be determined in accordance with a portion at which one of the NOx and the SOx is reduced on the NOx catalyst, and an amount of the reducing agent supplied from the reducing agent supply means may be determined in accordance with a reduction level required for the portion at which one of the NOx and the SOx is reduced on the NOx catalyst.

The reducing agent that has been supplied from the reducing agent supply means is carried by the exhaust gas at a relatively higher flow rate so as to be distributed to the downstream side of the NOx catalyst. Meanwhile, the reducing agent carried by the exhaust gas at a relatively lower flow rate is distributed to the upstream side of the NOx catalyst.

There is a high degree of correlation between the portion of the NOx catalyst to which the reducing agent is distributed and the flow rate of the exhaust gas flowing through the exhaust passage upon supply of the reducing agent to the exhaust gas. Assuming that the change in the flow rate of the exhaust gas with respect to time under the control executed by the exhaust gas flow control unit is predetermined, if the reducing agent is supplied from the reducing agent supply means at a timing when the flow rate of the exhaust gas flowing through the exhaust passage becomes the value corresponding to the portion at which the NOx or the SOx is required to be reduced on the NOx catalyst, the reducing agent may be preferentially distributed to the portion at which the NOx or the SOx is required to be reduced on the NOx catalyst.

In the case where there are a plurality of portions or wider range at which the NOx or the SOx is required to be reduced on the NOx catalyst, the reducing agent may be supplied from the reducing agent supply means at a plurality of timings when the flow rate of the exhaust gas flowing through the exhaust passage corresponds with such portions or the wider range at which the NOx or the SOx is required to be reduced on the NOx catalyst. This makes it possible to distribute the reducing agent to the plurality of portions or in the wider range where the NOx or the SOx is required to be reduced.

The reducing agent may be distributed into the wider range of the NOx catalyst as well as allowed to reach a plurality of portions at which the NOx or the SOx is required to be reduced on the NOx catalyst preferentially such that the NOx reducing method or the S-poisoning eliminating method is efficiently performed.

At each timing for supplying the reducing agent from the reducing agent supply means, the amount of the reducing agent is determined in accordance with the reduction level of the NOx or the SOx required to be reduced on the NOx catalyst. This makes it possible to sufficiently perform the NOx reducing method or the S-poisoning eliminating method at the portion where the NOx or the SOx is required to be reduced on the NOx catalyst. The amount of the reducing agent determined in accordance with the required reduction level may be set to the value corresponding to the amount of the reducing agent sufficient to perform the required reduction with respect to the NOx or SOx, or the value corresponding to the larger amount of the reducing agent that includes a predetermined margin.

The amount of the reducing agent supplied from the reducing agent supply means may be determined in accordance with the required reduction level of the NOx or the SOx required to be reduced on the NOx catalyst using a map that stores a correlation among a running distance of a vehicle provided with the engine, which is obtained upon completion of the previous NOx reducing method or the S-poisoning eliminating method, the position at which the NOx reducing method or the S-poisoning eliminating method is executed on the NOx catalyst, and the required reduction level in reference with the tendency of the temperature distribution in the NOx catalyst, which has been obtained in the previous cycle. That is, the amount of the reducing agent supplied from the reducing agent supply means required for the distributed position may be obtained by reading the value in accordance with the running distance of the vehicle in reference to the map.

The respective timings for supplying the reducing agent from the reducing agent supply means, and the amount of the reducing agent to be supplied therefrom may be determined in reference to a map that stores a correlation of the timing for supplying the reducing agent from the reducing agent supply means with the amount of the reducing agent to be supplied therefrom, and parameters such as the intake air amount, the exhaust gas temperature, the catalytic temperature, the valve driving speed of the engine and the like. Such determination may be made because the timing for supplying the reducing agent, and the amount of the reducing agent supplied from the reducing agent supply means are likely to be influenced by the intake air amount, the exhaust gas temperature, the catalytic temperature, and the valve driving speed of the engine.

In the above-structured system, the NOx catalyst may be formed as a group of a plurality of NOx catalysts, and the portion at which one of the NOx and the SOx is reduced on the NOx catalyst is determined for at lease one of the plurality of NOx catalysts.

In the case where the plurality of NOx catalysts are provided in the exhaust passage in series, only a part of the group of the NOx catalysts may be determined as the portion where the NOx or the SOx is required to be reduced on the NOx catalyst. This makes it possible to meet the need for reducing a part of the NOx catalysts required to be reduced by supplying the reducing agent to such part preferentially.

In the above-structured system, the exhaust passage is divided halfway into two branch passages, the exhaust gas flow control unit controls the flow rate of the exhaust gas that flows through the two branch passages, each of the two branch passages is provided with at least one NOx catalyst, respectively, and the reducing agent supply means is provided at each portion of the two branch passages upstream of the NOx catalysts, respectively. The exhaust gas flow control unit decreases the flow rate of the exhaust gas in one of the two branch passages, which is provided with the NOx catalyst having one of the NOx and the SOx required to be reduced to a value of approximately zero when the reducing agent is supplied to the NOx catalyst to reduce one of the NOx and the SOx thereon. A timing at which the reducing agent is supplied from the reducing agent supply means is determined such that the reducing agent supplied from the reducing agent supply means is distributed to a portion at which one of the NOx and the SOx is reduced on the NOx catalyst when the flow rate of the exhaust gas that flows through one of the two branch passage, which is provided with the NOx catalyst having one of the NOx and the SOx required to be reduced becomes approximately zero.

In the aforementioned structure, the exhaust passage of the engine is divided halfway into two branch passages, each of which is provided with the NOx catalyst and the exhaust emission control system including the reducing agent supply means. Each of the NOx catalysts disposed in those two branch passages is subjected to the NOx reducing method or S-poisoning eliminating method independently so as to prevent execution of the NOx reducing method or S-poisoning eliminating method from giving an influence on the operation state of the engine. When the reducing agent is supplied to the NOx catalyst so as to reduce the NOx or the SOx thereon, the exhaust gas flow control unit decreases the flow rate of the exhaust gas that flows through one of the branch passages, which is provided with the NOx catalyst having the NOx or the SOx required to be reduced to substantially zero.

Then the flow rate of the exhaust gas which has been determined in accordance with the operation state of the engine upon start-up of the exhaust gas flow control unit is changed to substantially zero. In the course of the change in the flow rate, the reducing agent is supplied from the reducing agent supply means to the exhaust gas that flows through the branch passage provided with the NOx catalyst required to be reduced. The supplied reducing agent is carried by the exhaust gas toward the downstream side of the branch passage, and stops at a time point when the flow rate of the exhaust gas becomes substantially zero. The NOx or the SOx at the position where the reducing agent stops flowing is reduced.

The timing for supplying the reducing agent by the reducing agent supply means is determined such that the reducing agent reaches the position at which the NOx or the SOx is required to be reduced on the NOx catalyst at a time when the flow rate of the exhaust gas flowing through the branch passage provided with the NOx catalyst having the NOx or SOx required to be reduced becomes substantially zero. This makes sure to supply the reducing agent to the position at which the NOx or the SOx is required to be reduced on the NOx catalyst through execution of the simple control method. Accordingly the NOx reducing method or S-poisoning eliminating method may be executed at the desired position of the NOx catalyst.

In the exhaust emission control system according to the aspect of the invention, the exhaust passage is divided into two branch passages, each provided with the NOx catalyst and the reducing agent supply means, respectively. Upon execution of the NOx catalyst recovery method, the exhaust gas flow rate inverse control is executed. Under the exhaust gas flow rate inverse control, the state where the flow rate of the exhaust gas flowing through one of those two branch passages is higher than that of the exhaust gas flowing through the other branch passage is changed to the state where the higher flow rate of the exhaust gas is reduced, and the lower flow rate of the exhaust gas is increased. At this time, the reducing agent may be supplied from the reducing agent supply means.

More specifically, in an exhaust emission control system for an internal combustion engine, which includes an exhaust passage having one end connected to the internal combustion engine, which is divided halfway into two branch passages, and admits a flow of exhaust gas discharged from the internal combustion engine, an exhaust gas flow control unit that controls the flow rate of the exhaust gas that flows through the two branch passages, at least one NOx catalyst provided for each of the two branch passages for purifying the NOx of the exhaust gas, and a reducing agent supply means provided in each of the two branch passages upstream of the NOx catalysts for supplying a reducing agent to the exhaust gas that flows through the two branch passages. In the above-structured system, the exhaust gas flow control unit executes an exhaust gas flow rate inverse control under which a state where a flow rate of the exhaust gas in one of the two branch passages is higher than that of the exhaust gas in the other branch passage is changed to a state where the higher flow rate of the exhaust gas in the one of the two branch passages is decreased and a flow rate of the exhaust gas in the other branch passage is increased when the reducing agent is supplied to the NOx catalyst on which one of the NOx and the SOx is reduced. The reducing agent is supplied from the reducing agent supply means upstream of the NOx catalyst to which the reducing agent is required to be supplied under the exhaust gas flow rate inverse control.

In the case where the reducing agent is supplied to the NOx catalyst provided in each of the branch passages in the same way as in the case of the aforementioned exhaust passage, a part of the reducing agent that has been supplied from the reducing agent supply means is in contact with the exhaust gas and oxidized without being used for the NOx reducing method. The higher the flow rate of the exhaust gas in each of the branch passages becomes, the more the rate of the reducing agent that is not used for the NOx reducing method to that of the reducing agent supplied from the reducing agent supply means increases. Accordingly the flow rate of the exhaust gas flowing through the respective branch passages should be reduced for the purpose of improving the fuel efficiency under the NOx reducing method.

Meanwhile the reducing agent supplied from the reducing agent supply means is carried by the high flow rate exhaust gas so as to reach the downstream side of the NOx catalyst. If the flow rate of the exhaust gas in each of the branch passages is low, the reducing agent supplied from the reducing agent supply means may fail to be distributed over the whole area of the NOx catalyst.

In the above-structured system, the exhaust passage is divided halfway into two branch passages, and the exhaust gas flow control unit controls the flow rate of the exhaust gas that flows through the two branch passages, at least one NOx catalyst (11a, 11b) is provided in each of the two branch passages, respectively, and the reducing agent supply means is provided in each of the two branch passages upstream of the NOx catalysts. The exhaust gas flow rate control unit executes an exhaust gas flow rate inverse control under which a state where a flow rate of the exhaust gas in one of the two branch passages is higher than that of the exhaust gas in the other branch passage is changed to a state where the higher flow rate of the exhaust gas in the one of the two branch passages is decreased and a flow rate of the exhaust gas in the other branch passage is increased when the reducing agent is supplied to the NOx catalyst on which one of the NOx and the SOx is reduced;

In the above-structured system, the higher flow rate of the exhaust gas flowing through one of the branch passages is decreased to be brought into the lower state. Meanwhile the lower flow rate of the exhaust gas flowing through the other branch passage is increased to be brought into the higher state.

This makes it possible to supply the reducing agent to the NOx catalyst in both states of the exhaust gas at the higher and lower flow rates. In case of the higher flow rate of the exhaust gas, the reducing agent can be distributed over the whole area of the NOx catalyst. Meanwhile in case of the lower flow rate of the exhaust gas, deterioration in efficiency of consuming the reducing agent under the NOx catalyst recovery method may be restrained.

Upon execution of the exhaust gas flow rate inverse control, when the flow rate of the exhaust gas flowing through one of those two branch passages is higher than that of the exhaust gas flowing through the other branch passage, it is preferable that the exhaust gas at the higher flow rate in the branch passage be made further higher. After decreasing the higher flow rate of the exhaust gas flowing through the branch passage, it is preferable that the exhaust gas at the decreased flow rate be made further lower. That is, the change in the flow rate of the exhaust gas flowing through the branch passage should be made as large as possible.

The large change in the flow rate of the exhaust gas makes it possible to supply the reducing agent to the NOx catalyst from the reducing agent supply means so as to increase the freedom degree with respect to the timing for supplying the reducing agent under the exhaust gas flow rate inverse control.

If the operation state of the engine is kept constant, the sum of the respective flow rates of the exhaust gas in those two branch passages becomes substantially constant. Accordingly, the large change in the flow rate of the exhaust gas in one of the branch passages indicates the large change in the flow rate of the exhaust gas in the other branch passage.

In the above-structured system, under the exhaust gas flow rate inverse control, the exhaust gas flow control unit changes a state where a ratio of a total flow rates of the exhaust gas in the two branch passages to a flow rate of the exhaust gas in one of the two branch passages takes a maximum value, and the ratio of the total flow rates to a flow rate of the exhaust gas in the other branch passage takes a minimum value to a state where the ratio that takes the maximum value is minimized, and the ratio that takes the minimum value is maximized.

In the above-structured system, when the reducing agent is supplied to the respective branch passages, the flow rate of the exhaust gas may be changed from the maximum value to the minimum value or from the minimum value to the maximum value, thus maximizing the change in the flow rate of the exhaust gas. Accordingly the freedom degree with respect to the timing for supplying the reducing agent under the exhaust gas flow rate inverse control can further be increased. This may distribute the reducing agent over the whole area of the NOx catalyst as well as restrain the deterioration in the efficiency of consuming the reducing agent under the NOx catalyst recovery method.

In the above-structured system, the exhaust gas flow control unit includes an exhaust gas flow control valve in each of the two branch passages, and under the exhaust gas flow rate inverse control, the exhaust gas flow control unit may be structured to change a state where the exhaust gas flow control valve in one of the two branch passages is fully opened, and the exhaust gas flow control valve in the other branch passage is fully closed to a state where the exhaust gas flow control valve that has been fully opened is fully closed, and the exhaust gas flow control valve that has been fully closed is fully opened.

In the above-structured system, the state where the rate of the flow rate of the exhaust gas flowing through one of the branch passages to the sum of the flow rates flowing through both branch passages is maximum, and the flow rate of the exhaust gas flowing through the other branch passage to the sum of the flow rates is minimum may be changed to the state where the maximum rate is inversed to the minimum rate, and the minimum rate is inversed to the maximum rate.

In the above-structured system, the reducing agent may be supplied from each of the reducing agent supply means in the two branch passages to the NOx catalyst downstream of the reducing agent supply means for reducing one of the NOx and the SOx on the NOx catalyst. Accordingly the NOx reducing method may be executed in each of the two branch passages at one time.

In the above-structured system, the exhaust gas flow control unit may be structured to execute the exhaust gas flow rate inverse control repeatedly for a predetermined period. That is, in the case where the NOx catalyst recovery method has not been completed within a time period for which a cycle of the exhaust gas flow rate inverse control is executed, the exhaust gas flow rate inverse control is repeatedly executed until the NOx catalyst recovery method ends. Alternatively the reducing agent may be supplied from the reducing agent supply means to a portion upstream of the NOx catalyst to which the reducing agent is required to be supplied under the exhaust gas flow rate inverse control. This makes sure to complete the NOx catalyst recovery method.

In the above-structured system, under the exhaust gas flow rate inverse control, the reducing agent supply means in each of the branch passages may decrease an amount of the reducing agent supplied from the reducing agent supply means as the flow rates of the exhaust gas in the branch passages decrease, and increase the amount of the reducing agent supplied from the reducing agent supply means as the flow rates of the exhaust gas in the branch passages decrease.

In the case where the flow rate of the exhaust gas flowing through the respective branch passages is high, the rate of the amount of the reducing agent used for the NOx catalyst recovery method to the amount of the reducing agent that has been supplied from the reducing agent supply means is small. The reducing agent supplied to the exhaust gas at higher flow rate is intended to be distributed to the position far from the downstream side of the NOx catalyst. Accordingly, the amount of the reducing agent supplied from the reducing agent supply means is decreased as the flow rate of the exhaust gas in the branch passage is decreased. That is, the higher the flow rate of the exhaust gas becomes, the larger the amount of the reducing agent supplied from the reducing agent supply means is increased. This makes it possible to distribute the reducing agent over the whole area of the NOx catalyst. As a result, the NOx catalyst recovery method can be executed efficiently.

According to the aspect of the invention, in a purification capacity recovery method of the exhaust emission control system that includes an exhaust passage having one end connected to an internal combustion engine, and admits a flow of exhaust gas discharged from the internal combustion engine, and a NOx catalyst provided in the exhaust passage, and a reducing agent supply means for supplying a reducing agent to the exhaust gas that flows through the exhaust passage by at least one discharging operation of the reducing agent under a rich spike control where an air/fuel ratio of the exhaust gas is temporarily brought into a rich state, the method characterized by comprising the steps of: controlling the flow rate of the exhaust gas that flows through the exhaust passage when the reducing agent is supplied to the NOx catalyst on which one of a NOx and a SOx is reduced; and supplying the reducing agent to a portion upstream of the NOx catalyst at a plurality of timings when the exhaust gas flows at different flow rates during change in the flow rate of the exhaust gas.

According to the aforementioned method is used for the exhaust emission control system, the reducing agent may be supplied to the exhaust gas at a plurality of timing when the exhaust gas at different flow rates flows through the exhaust passage, which is provided with the NOx catalyst having the NOx or the SOx required to be reduced, while restraining uneven distribution of the reducing agent to a specific portion of the NOx catalyst. Accordingly the reducing agent may be evenly distributed over the whole area of the NOx catalyst.

In the above-described method, the plurality of timings at which the reducing agent is supplied from the reducing agent supply means include a first timing at which the flow rate of the exhaust gas that flows through the exhaust passage becomes a predetermined first flow rate, and a second timing at which the flow rate of the exhaust gas that flows through the exhaust passage becomes a predetermined second flow rate. When the flow rate of the exhaust gas that flows through the exhaust passage becomes the first flow rate, a predetermined first reducing amount of the reducing agent is supplied to the exhaust gas that flows through the exhaust passage. When the flow rate of the exhaust gas that flows through the exhaust passage becomes the second flow rate, a predetermined second reducing amount of the reducing agent is supplied to the exhaust gas that flows through the exhaust passage. The first and the second flow rates of the exhaust gas may be determined in accordance with a portion at which one of a NOx and a SOx is required to be reduced on the NOx catalyst, and the first and the second reducing agent amounts may be determined in accordance with a reduction level required to the portion at which one of the NOx and the SOx is required to be reduced on the NOx catalyst.

Each of the first and the second exhaust gas flow rates is determined in accordance with the portion at which the NOx or the SOx is required to be reduced on the NOx catalyst, respectively. That is, those first and the second exhaust gas flow rates are experimentally predetermined as optimal values such that the supplied reducing agent is distributed to two portions at which the NOx or the SOx is required to be reduced on the NOx catalyst, respectively. The first and the second amounts of the reducing agent are determined in accordance with the reduction level of the NOx or the SOx on the NOx catalysts at the two respective portions.

In the above-described method, the flow rate of the exhaust gas that flows through the exhaust passage is detected or estimated. When the detected or estimated flow rate becomes the first exhaust gas flow rate, the reducing agent by the amount corresponding to the first reducing agent amount is supplied. When the resultant flow rate becomes the second exhaust gas flow rate, the reducing agent by the amount corresponding to the second reducing agent amount is supplied. Under such a simple control, each of the reducing agents may be supplied by the amount corresponding to the value required at the respective two portions of the NOx catalyst having the NOx or the SOx required to be reduced, respectively. This makes it possible to execute the NOx reducing method or the S-poisoning eliminating method with respect to the NOx catalyst further efficiently.

In the aforementioned case, the first and the second reducing agent amounts are determined in accordance with the reduction level of the NOx or the SOx required to be reduced on the NOx catalyst. More specifically, a correlation among the running distance of the vehicle including the engine obtained after completion of the previous NOx reducing method or the S-poisoning eliminating method, the portion of the NOx catalyst required to be reduced, and the required reducing agent amount is stored in a map in consideration with the tendency of the temperature distribution of the NOx catalyst, based on which the reducing agent amount required for the respective portions in accordance with the running distance may be obtained.

In the above-described method, the correlation of the first/second exhaust gas flow rates and the first/second reducing agent amounts with parameters such as the intake air amount, exhaust gas temperature, catalytic temperature, and valve driving speed of the engine is stored in the map. The first/second exhaust gas flow rates and the first/second reducing agent amounts may be determined by reading the value corresponding to the parameters in reference to the map.

In the above-described method, the NOx catalyst is formed of a group of a plurality of NOx catalysts, and the portion at which one of the NOx and the SOx is required to be reduced on the NOx catalyst is determined for at lease one of the plurality of NOx catalysts.

In the case where a specific part of the plurality of NOx catalysts arranged in series is required to have the NOx or the SOx reduced, the reducing agent may be supplied to such specific part of the NOx catalysts preferentially.

According to an anther aspect of the invention, in a purification capacity recovery method of an exhaust emission control system that includes an exhaust passage divided halfway into two branch passages, a state where the exhaust gas discharged from the internal combustion engine at a whole flow rate flows through one of the two branch passages is changed to a state where the exhaust gas discharged from the internal combustion engine at the whole flow rate flows through the other branch passage when the reducing agent is supplied to the NOx catalyst on which one of the NOx and the SOx is reduced. The reducing agent may be supplied upstream of the NOx catalyst to which the reducing agent is required to be supplied.

The method makes it possible to supply the reducing agent to the NOx catalysts in the respective branch passages through which the exhaust gas both at high and low flow rates flows. Accordingly in the branch passage through which the exhaust gas at the high flow rate flows, the reducing agent may be distributed over the whole area of the NOx catalyst, and in the branch passage through which the exhaust gas at the low flow rate flows, deterioration in efficiency of consuming the reducing agent under the NOx catalyst recovery method may be restrained.

The various units or means incorporated in the system as aforementioned may be arbitrarily combined.

The exhaust emission control system provided with the NOx catalyst according to the invention makes it possible to execute the NOx reducing method or the S-poisoning eliminating method efficiently.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 2 is a time chart showing an operation of the first valve, an operation of the first fuel supply valve, and an amount of the exhaust gas flowing to the first filter in related art;

FIG. 3 is a time chart showing an operation of the first valve, an operation of the first fuel supply valve, and a flow rate of the exhaust gas flowing to the first filter in the first embodiment of the invention;

DETAILED DESCRIPTION OF PREFERRED EMBODIMENTS

Figure 1:
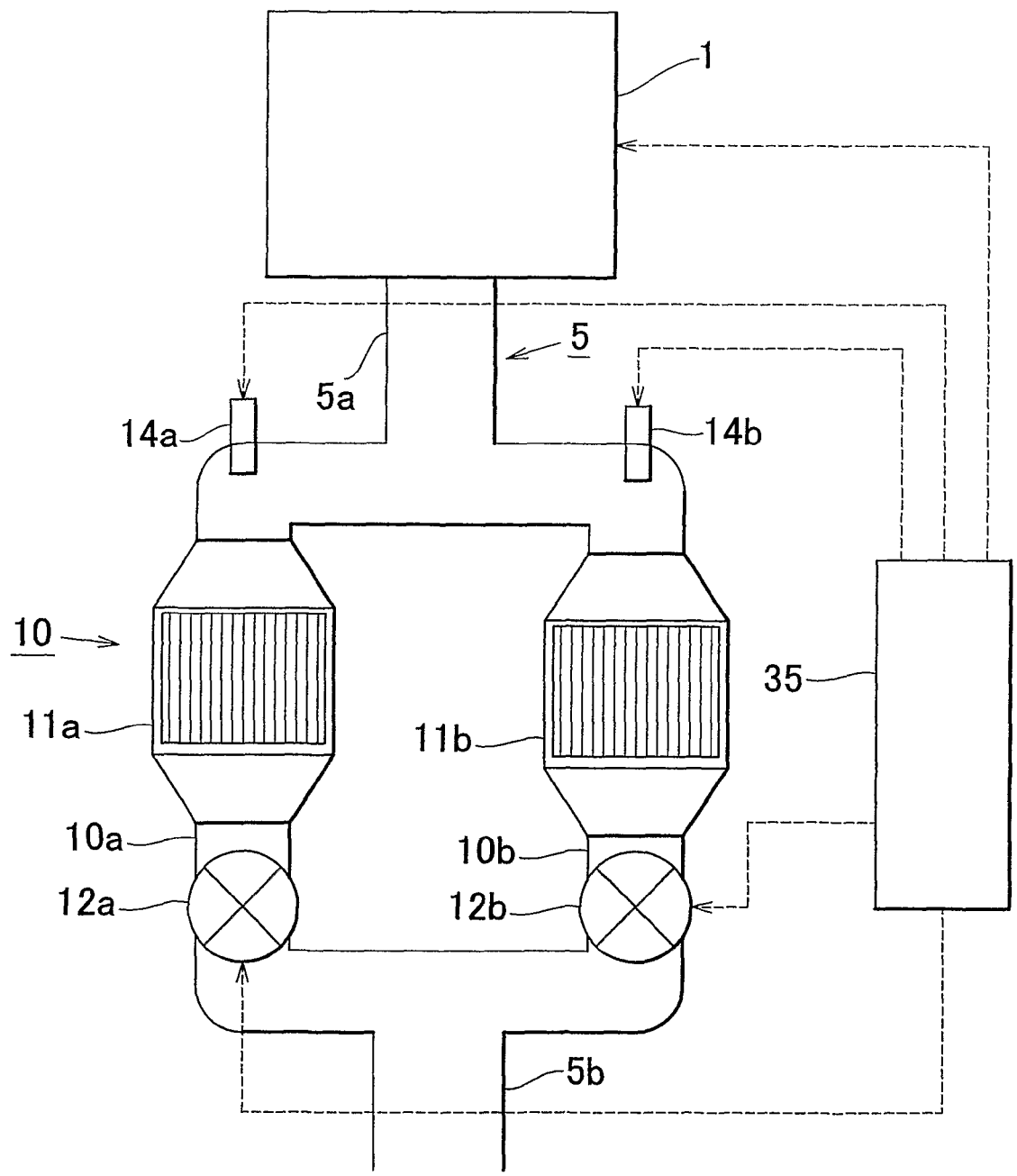
FIG. 1 is a schematic view showing an internal combustion engine, an exhaust system and a control system according to an embodiment of the invention.

The explanation with respect to embodiments of the invention will be described in detail referring to the drawings.

First Embodiment

FIG. 1 is a schematic view of an internal combustion engine according to the first embodiment, and structures of an exhaust system and a control system. An internal combustion engine 1 shown in FIG. 1 is a diesel engine. In FIG. 1, the inner structure and the intake system of the internal combustion engine 1 are omitted.

Referring to FIG. 1, the internal combustion engine 1 is connected to an exhaust pipe 5 through which the exhaust gas discharged from the internal combustion engine 1 flows. An exhaust gas purification unit 10 that purifies particulate matters (for example, soot) and NOx contained in the exhaust gas is provided halfway of the exhaust pipe 5. The portion of the exhaust pipe 5 upstream of the exhaust purification unit 10, and the portion of the exhaust pipe 5 downstream of the exhaust purification unit 10 are referred to as a first exhaust pipe 5a and a second exhaust pipe 5b, respectively. Within the exhaust purification unit 10, the first exhaust pipe 5a is divided into a first branch passage 10a and a second branch passage 10b, respectively. The first and the second branch passages 10a and 10b join together at the downstream side to form the second exhaust pipe 5b. The first branch passage 10a is provided with a first filter 11a that traps particulate matters (soot, for example) contained in the exhaust gas, and further occludes the NOx of the exhaust gas so as to be reduced. The second branch passage 10b is provided with a second filter 11b likewise the first branch passage 10a. In the embodiment, the first exhaust pipe 5a, first branch passage 10a, the second branch passage 10b, and the second exhaust pipe 5b constitute the exhaust passage.

Each of the first and the second filters 11a and 11b is formed by carrying an occlusion/reduction type NOx catalyst on a particulate filter of wall flow type formed of a porous base material. The occlusion/reduction type NOx catalyst does not have to be carried on the particular filter for forming the first and the second filters 11a, 11b. Each of the first and the second filters 11a, 11b may be formed of the particulate filter with no occlusion/reduction type NOx catalyst carried thereon, and the occlusion/reduction type NOx catalyst which is arranged in series therewith. It is to be understood that the catalyst is not limited to the occlusion/reduction type NOx catalyst but may be formed as the NOx catalyst of arbitrary type.

A portion of the first branch passage 10a downstream of the first filter 11a is provided with a first valve 12a that controls a flow rate of the exhaust gas flowing through the first branch passage 10a. Likewise a portion of the second branch passage 10b downstream of the second filter 11b is provided with a second valve 12b. Each of the first and the second valves 12a and 12b is formed as the exhaust gas flow control valve in the embodiment.

Referring to FIG. 1, a portion of the first branch passage 10a upstream of the first filter 11a is provided with a first fuel supply valve 14a that supplies the fuel as a reducing agent to the exhaust gas under the NOx catalyst recovery method to the first filter 11a. Likewise, a portion of the second branch passage 10b upstream of the second filter 11b is provided with a second fuel supply valve 14b. Each of the first and the second fuel supply valves 14a and 14b is formed as the reducing agent supply means in the embodiment.

The above-structured internal combustion engine 1 and the exhaust system provided therein include an electronic control unit (ECU) 35 for controlling the internal combustion engine 1 and the exhaust system. The ECU 35 is a unit that controls operating conditions, operation states of the engine 1 in response to the request of the driver and the like as well as operations of an exhaust purification portion 10 of the engine 1.

The ECU 35 is electrically connected to various sensors employed for controlling the operation state of the engine 1, for example, a crank position sensor, an accelerator position sensor and the like (not shown). Output signals of those sensors are input to the ECU 35. Meanwhile, the ECU 35 is electrically connected to the fuel injection valve and the like (not shown) in the engine 1 as well as the first and the second valves 12a, 12b, and the first and the second fuel supply valves 14a, 14b, respectively so as to be controlled by the ECU 35. The first and the second valves 12a, 12b and the ECU 35 constitute the exhaust gas flow control unit in the embodiment.

The ECU 35 includes a CPU, a ROM, a RAM and the like. The ROM stores programs for executing various control routines with respect to the engine 1, and a map that contains data. The program stored in the ROM of the ECU 35 also includes the routine for the NOx reducing method for reducing the NOx occluded in the first and the second filters 11a, 11b so as to be released, the S-poisoning eliminating method (explanation will be omitted) and the like.

An example of a general control routine for the NOx reducing method in the exhaust system of the engine 1 will be described in reference to each change in the operations of the first valve 12a, the first fuel supply valve 14a, and the flow rate of exhaust gas flowing into the first filter 11a referring to FIG. 2. FIG. 2 is a time chart representing the operations of the first valve 12a, the first fuel supply valve 14a, and the flow rate of exhaust gas flowing into the first filter 11a with respect to time as a horizontal axis.

Upon execution of the NOx reducing method applied to the first filter 11a, the ECU 35 issues a fully closing command to the first valve 12a, and a fully opening command to the second valve 12b. The substantially all the exhaust gas flowing through the first exhaust pipe 5a is directed to flow through the second branch passage 10b. Accordingly as shown in FIG. 2, after the issuance of the fully closing command to the first valve 12a, the flow rate of the exhaust gas flowing through the first NOx catalyst 11a decreases to substantially zero.

Upon an elapse of a predetermined delay time $\Delta T$ after the issuance of the fully closing command to the first valve 12a, the fuel as the reducing agent is supplied to the exhaust gas from the first fuel supply valve 14a. The delay time $\Delta T$ is determined such that in the course of the decrease in the flow rate of the exhaust gas flowing into the first filter 11a, the fuel supplied to the exhaust gas from the first fuel supply valve 14a is carried to the downstream side by the exhaust gas, and the fuel as the reducing agent is distributed within the first filter 11a as the flow rate of the exhaust gas becomes substantially zero when the fuel reaches the first filter 11a.

While the reducing agent is being distributed within the first filter 11a, the NOx carried on the first filter 11a is reduced. After an elapse of a predetermined time, the ECU 35 releases the fully closing command to the first valve 12a and the fully opening command to the second valve 12b. Then the flow rate of the exhaust gas flowing to the first filter 11a starts increasing to the value equivalent to the one prior to the execution of the NOx reducing method.

When the first valve 12a is brought into a fully closed state and the flow rate of the exhaust gas flowing into the first filter 11a becomes substantially zero, the fully closed state of the first valve 12a is released. The time period taken from the release of the fully closed state of the first valve 12a until the flow rate of the exhaust gas flowing into the first filter 11a starts increasing will be referred to as a "flow stop period".

In the case where there is a variation in the operation state of the engine 1, the valve closing speed of the first valve 12a, and the delay time ΔT, the fuel supplied from the first fuel supply valve 14a may be unevenly distributed to a certain portion of the first filter 11a rather than being evenly distributed within the first filter 11a when the flow rate of the exhaust gas flowing to the first filter 11a becomes substantially zero. For example, if the delay time ΔT is too short, the distance for which the fuel supplied from the first fuel supply valve 14a is distributed prior to the flow stop period becomes long. Accordingly the fuel is distributed unevenly to the downstream side of the first filter 11a during the flow stop period. Meanwhile if the delay time ΔT is too long, the distance for which the fuel supplied from the first fuel supply valve 14a is distributed prior to the flow stop period becomes short. Accordingly the fuel is distributed unevenly to the upstream side of the first filter 11a. This may fail to sufficiently reduce the NOx occluded in the first filter 11a over a whole area thereof.

In the embodiment, the fuel supply from the first fuel supply valve 14a is performed twice. More specifically, when the flow rate of the exhaust gas flowing to the first filter 11a decreases to substantially zero upon the issuance of the fully closing command to the first valve 12a, the fuel supply from the first fuel supply valve 14a is executed twice at timings when the exhaust gas flows into the first filter 11a at different flow rates.

FIG. 3 is a time chart that represents the operations of the first valve 12a and the first fuel supply valve 14a, and the flow rate of the exhaust gas flowing to the first filter 11a. Referring to FIG. 3, the first fuel supply from the first fuel supply valve 14a is executed upon an elapse of a predetermined first delay time ΔT1 from the issuance of the fully closing command to the first valve 12a. The second fuel supply is further executed upon an elapse of a predetermined second delay time ΔT2.

The first delay time ΔT1 is experimentally predetermined such that the supplied fuel is distributed to the downstream side of the first filter 11a when the flow rate of the exhaust gas flowing to the first filter 11a decreases to substantially zero. Likewise the second delay time ΔT2 is experimentally predetermined such that the supplied fuel is distributed to the upstream side of the first filter 11a when the flow rate of the exhaust gas flowing to the first filter 11a decreases to substantially zero.

The first and the second delay times ΔT1 and ΔT2 are likely to be influenced by the intake air amount, the exhaust gas temperature, the catalytic temperature, and the valve driving speed of the engine 1. This is because as the intake air amount increases, the intake air amount to the first branch passage 10a for the same delay period increases. As the exhaust gas temperature or the catalytic temperature increases, the distribution speed of the supplied fuel increases, and as the valve driving speed increases, the intake air amount to the first branch passage 10a is reduced. Accordingly the first and the second delay times ΔT1 and ΔT2 may be determined in reference to the map that stores the correlation of the delay time with parameters such as the intake air amount, exhaust gas temperature, catalytic temperature, valve driving speed of the engine 1 and the like.

The fuel may be supplied through a single discharging operation from the first fuel supply valve 14a in a single cycle of the fuel supply operation. Alternatively the fuel may be supplied through a plurality of discharging operations sequentially executed.

The embodiment is structured to supply the fuel twice for the period from the issuance of the fully closing command to the first valve 12a until the flow rate of the exhaust gas flowing to the first filter 11a becomes substantially zero. That is, the fuel is supplied for the first time upon an elapse of the first delay time ΔT1 from the issuance of the fully closing command, and the fuel is supplied for the second time upon an elapse of the second delay time ΔT2.

Accordingly the fuel may be supplied to the upstream side and the downstream side of the first filter 11a, thus evenly distributing the fuel over the whole area of the first filter 11a.

Second Embodiment

A second embodiment of the invention will be described. The exhaust emission control system of the second embodiment is substantially the same as that shown in FIG. 1 except that each structure of the first and the second filters of the embodiment is different from that shown in FIG. 1.

Figure 4A:
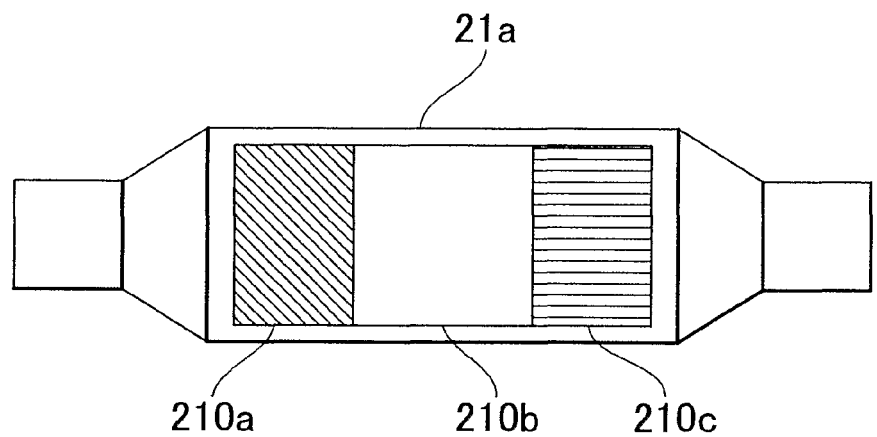
FIGS. 4A to 4C schematically show each structure of the first filter according to the second embodiment of the invention.
Figure 4B:
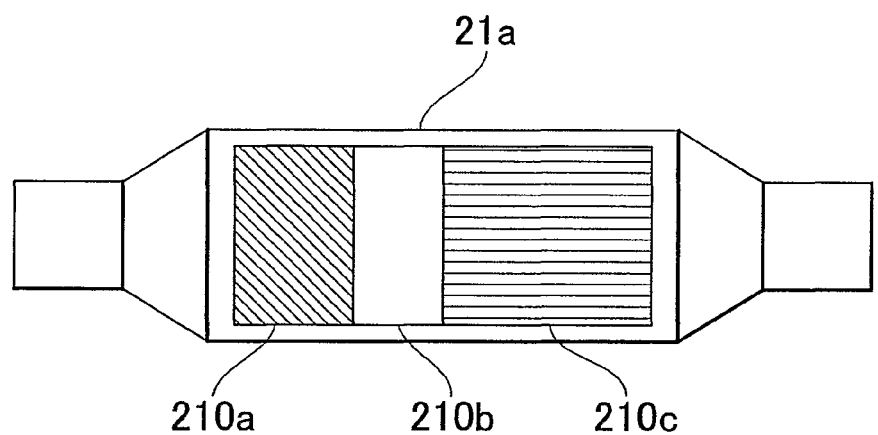
Figure 4C:
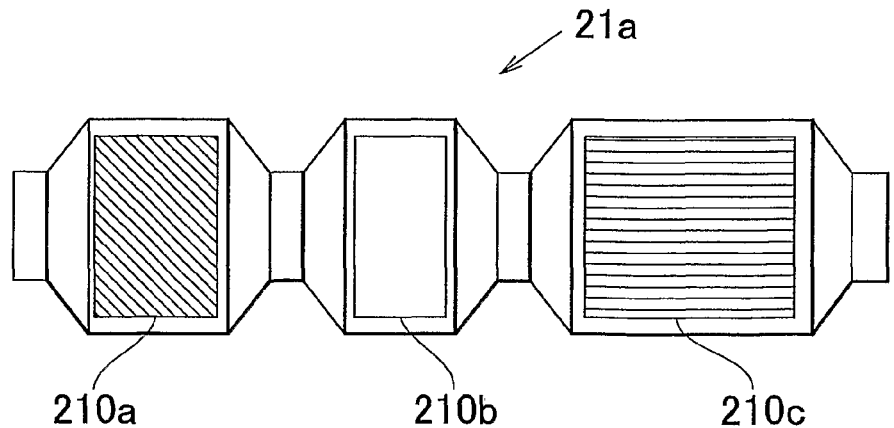
Figure 5:
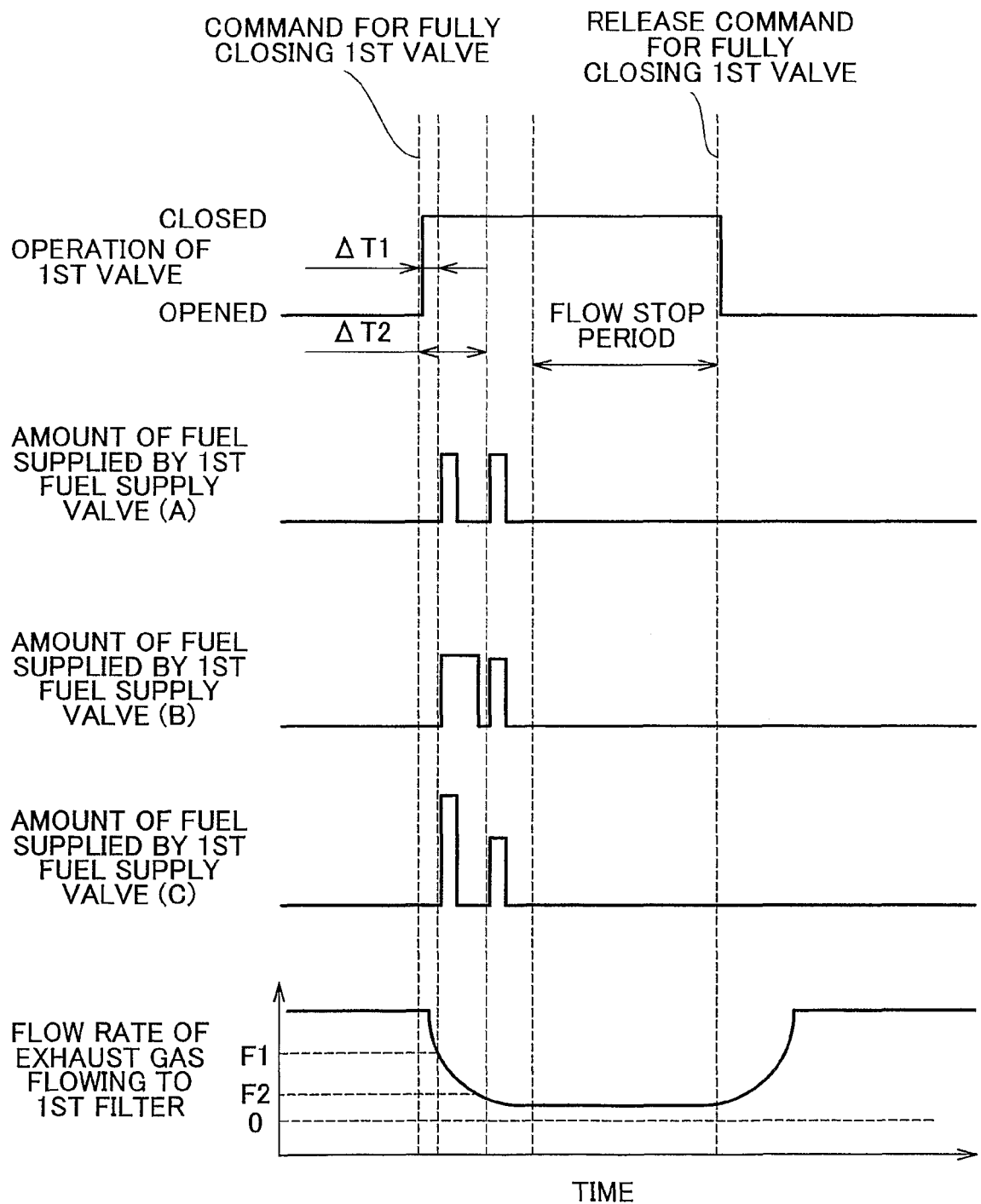
FIG. 5 is a time chart showing an operation of the first valve, an operation of the first fuel supply valve, and a flow rate of the exhaust gas flowing to the first filter in the second embodiment of the invention.

FIGS. 4A to 4C represent each structure of a first filter 21a according to the second embodiment of the invention. FIG. 5 is a time chart that represents an operation of the first valve 12a, the flow rate of the fuel supplied from the first fuel supply valve 14a, and the flow rate of the exhaust gas flowing to the first filter 21a. The second filter 21b is not shown in FIGS. 4A to 4C as it has the same structure as that of the filter 21a. FIG. 4A shows a first type of the first filter 21a of the second embodiment. In this type, an occlusion/reduction type NOx catalyst (hereinafter referred to as upstream side NOx catalyst) 210a, a filter portion 210b, and an occlusion/reduction type NOx catalyst (hereinafter referred to as downstream side NOx catalyst) 210c arranged in series in a single casing. The filter portion 210b is a particulate filter of wall flow type formed of a porous base material, which does not have the NOx catalyst carried thereon.

Upon execution of the NOx reducing method to the first filter 21a, the fuel is supplied by the first fuel supply valve 14a twice as indicated by the amount of the fuel supplied from the first fuel supply valve (A) in the time chart of FIG. 5 (the time chart with respect to the operation of the first fuel supply valve 14a in this case is the same as that shown in FIG. 3.). The first and the second delay times ΔT1 and ΔT2 are experimentally predetermined values such that each flow rate of the exhaust gas flowing to the first filter 21a becomes a predetermined first and the second exhaust gas flow rates F1 and F2, respectively for the period from the issuance of the fully closing command to the first valve 12a until the flow rate of the exhaust gas flowing to the first filter 11a becomes substantially zero.

The first exhaust gas flow rate F1 is experimentally predetermined as the flow rate of the exhaust gas such that the fuel supplied from the first fuel supply valve 14a when the flow rate of the exhaust gas flowing to the first filter 21a becomes substantially zero is distributed to the downstream side NOx catalyst 210c of the first filter 21a.

Likewise the second exhaust gas flow rate F2 is experimentally predetermined such that the fuel supplied from the first fuel supply valve 14a when the flow rate of the exhaust gas flowing to the first filter 11a becomes substantially zero reaches the upstream side NOx catalyst 210a.

For the period from the issuance of the fully closing command to the first valve 12a until the flow rate of the exhaust gas flowing to the first filter 21a becomes substantially zero, upon elapses of the first and the second delay times ΔT1, ΔT2 from the issuance of the fully closing command, the first fuel supply valve 14a supplies the fuel so as to be added to the exhaust gas flowing through the first branch passage 10a. Accordingly the fuel can be supplied selectively to the upstream side NOx catalyst 210a or the downstream side NOx catalyst 210c. In other words, this makes it possible to avoid unnecessary supply of the fuel to the filter portion 210b that is not required to be subjected to the NOx reducing method.

This may improve the reducing efficiency of the NOx reducing method, thus improving the fuel efficiency while making sure to execute the NOx reducing method to the portion required to be subjected to the NOx reduction.

A second type of the first filter 21a of the embodiment will be described referring to FIG. 4B. In this type, it is assumed that the capacity of the downstream side NOx catalyst 210c of the first filter 21a is larger than that of the upstream side NOx catalyst 210a. In this case, the required reduction level with respect to the downstream NOx catalyst 210c becomes higher than that with respect to the upstream NOx catalyst 210a.

In the aforementioned case, the flow rate of the fuel supplied from the first fuel supply valve 14a for the first delay time ΔT1 is increased to be larger than that of the fuel supplied from the first fuel supply valve 14a for the second delay time ΔT2 such that each flow rate of the fuel supplied from the first fuel supply valve 14a for the first and the second delay times satisfies the required reduction levels at the downstream side NOx catalyst 210c and the upstream side NOx catalyst 210a, respectively as indicated by the flow rates (B) and (C) of the fuel supplied from the first fuel supply valve 14a in the time chart of FIG. 5.

This makes it possible to execute the fuel supply by the amount of the reducing agent at the delay time in accordance with the portion and capacity of each of the upstream side NOx catalyst 210a and the downstream side NOx catalyst 210c, respectively. Accordingly the deterioration in the fuel efficiency owing to unnecessary fuel supply may be avoided, thus making sure to execute the NOx reducing method with respect to a plurality of NOx catalysts.

In the case where the first fuel supply valve 14a supplies the fuel at a single cycle, when the flow rate of the fuel supplied from the first fuel supply valve 14a is changed, the time period for supplying the fuel at the single cycle is increased, that is, the valve opening period of the first reducing agent supply valve 14a is increased. The time chart of the flow rate of the fuel supplied from the first fuel supply valve 14a is shown as (B) in FIG. 5. In the case where the fuel supply is executed by a plurality of operations of the first fuel supply valve 14a, the density of a plurality of the fuel supply operations is increased, that is, the time interval between the fuel supply operations may be reduced. The time chart of the flow rate of the fuel supplied from the first fuel supply valve 14a is shown as (C) in FIG. 5.

A third type of the first filter 21a according to the embodiment will be described referring to FIG. 4C. Each of the first filter 21a of the first and the second types has a structure in which a plurality of NOx catalysts and the filter portion are arranged in series in a single casing. In the structure of this type, the first filter 21a is formed of the upstream side NOx catalyst 210a, the filter portion 210b, and the downstream NOx catalyst 210c each stored in the respective casing and connected in series with the first branch passage 10a.

The same fuel supply control applied to the first filter 21a of the second type may be applied to the first filter 21a of the third type. This makes it possible to execute the fuel supply operation at the delay time by the amount of the reducing agent in accordance with the portion and the capacity of each of the upstream side NOx catalyst 210a and the downstream side NOx catalyst 210c. Accordingly the deterioration in the fuel efficiency owing to unnecessary fuel supply may be avoided, and the NOx reducing method or the S-poisoning eliminating method may be executed with respect to a plurality of NOx catalysts.

The first delay time ΔT1, the second delay time ΔT2 and the fuel supply amounts required for the respective delay times in the second embodiment are likely to be influenced by the intake air amount, the exhaust gas temperature, the catalytic temperature, the valve driving speed of the engine 1 and the like. Accordingly, the first and the second delay times ΔT1, ΔT2, and the fuel supply amounts required for the respective delay times may be obtained by reading in reference to the map that stores the correlation of the delay time or the fuel supply amount with parameters such as the intake air amount, exhaust gas temperature, catalytic temperature, and valve driving speed of the engine 1.

In the first and the second embodiments, the fuel is supplied twice, that is, at an elapse of the first delay time ΔT1 and at an elapse of the second delay time ΔT2 from the fully closing command for the period from the issuance of the fully closing command to the first valve 12a until the flow rate of the exhaust gas flowing to the first filter 11a becomes substantially zero. The frequency of the fuel supply is not limited to twice as aforementioned. In the case where the length of the first filter 11a is longer in the first embodiment, or the first filter 11a is formed of more NOx catalysts and the filters arranged in series in the second embodiment, the fuel supply may be executed twice or more times.

In the first and the second embodiments, the first and the second delay times ΔT1 and ΔT2 are predetermined or read from a predetermined map. Such predetermined values or the map may be updated at each execution of the NOx reducing method. For example, the ratio of purifying the NOx of the exhaust gas flowing through the first filter is detected by the NOx sensor upon completion of the NOx reducing method to the first filter. Then if the NOx purification ratio is low, it is determined that the first and the second delay times ΔT1 and ΔT2 deviate from the range of the appropriate values, thus updating those values or the map. In this case, adjustment of the first and the second delay times ΔT1 and ΔT2, that is, delaying or advancing such time may be determined depending on the change in the NOx purification ratio, which is detected after updating of either delaying or advancing the time.

This makes it possible to use appropriate values of the first and the second delay times ΔT1 and ΔT2, allowing the efficient and reliable execution of the NOx reducing method.

In the first and the second embodiments, after the issuance of the fully closing command to the first valve 12a, and the fully opening command to the second valve 12b, the first filters 11a, 21a are subjected to the NOx reducing method. The same control may be executed under the NOx reducing method for the second filters 11b, 21b after the issuance of the fully opening command to the first valve 12a and the fully closing command to the second valve 12b. Accordingly the NOx reducing method for the second filters 11b and 21b is effectively and reliably executed. It is to be understood likewise the case where the first filters 11a, 21a are subjected to the NOx reducing method, the same control may be applied to the second filters 12b, 21b.

In the first and the second embodiments, the NOx reducing method is executed for the first filters 11a, 21a. The same control may be applied upon execution of the S-poisoning eliminating method for the first filters 11a, 21a or the second filters 11b, 21b.

Third Embodiment

Figure 6:
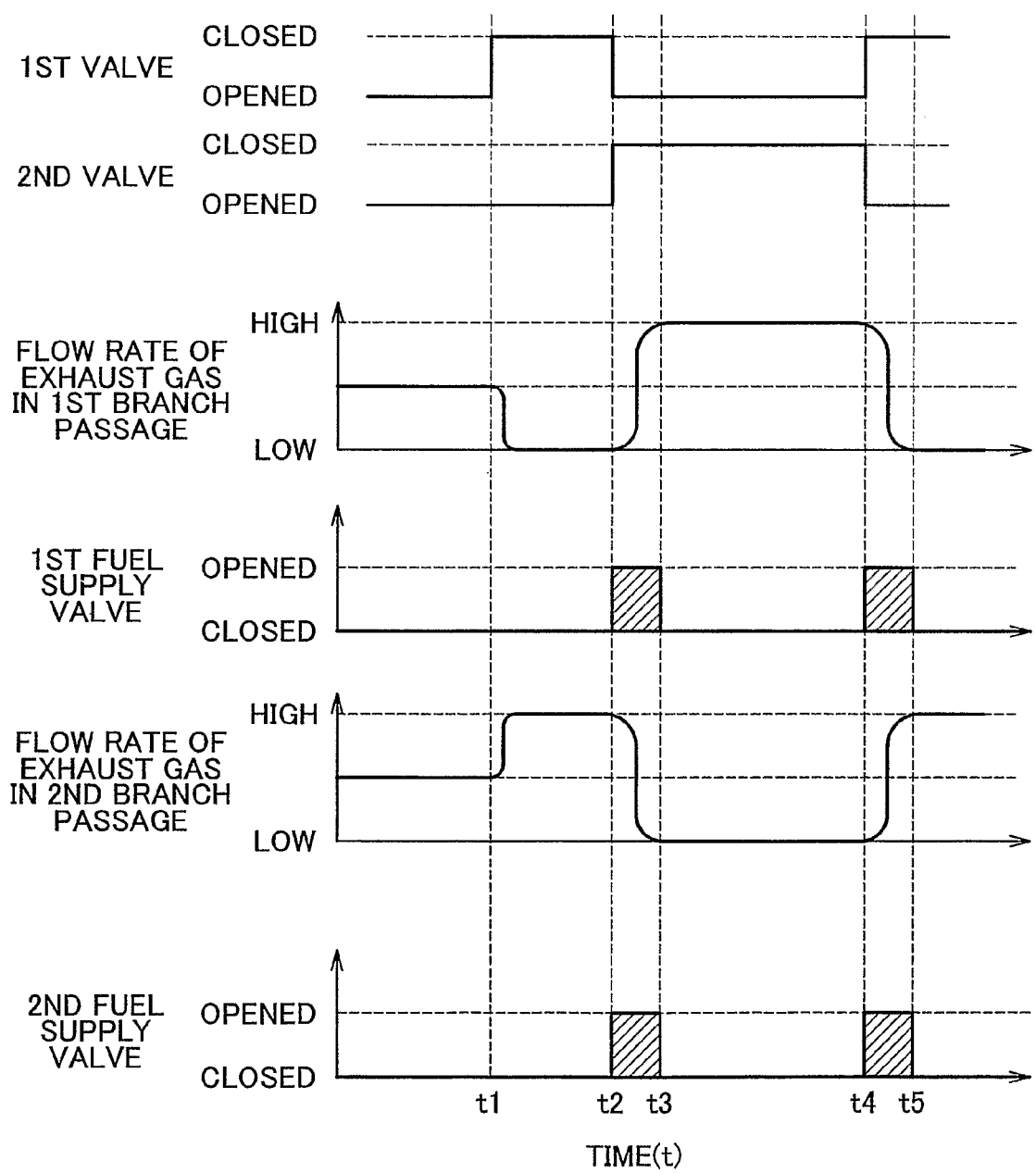
FIG. 6 is a time chart showing an operation of each of the exhaust gas flow control valves under the NOx reducing method, resultant changes in the respective flow rates of the exhaust gas flowing through the respective branch passages, and operations of the respective fuel supply valves according to the third embodiment of the invention.

The control routine executed in the exhaust emission control system according to a third embodiment of the invention under the NOx reducing method will be described hereinafter. FIG. 6 is a time chart that represents the operation of each of the exhaust gas flow control valves under the NOx reducing method, the change in the exhaust gas flow rate in each of the branch passages upon the operation of the exhaust gas flow control valve, and the operation of each of the fuel supply valves, respectively. The horizontal axis of the time chart in FIG. 6 represents time.

Referring to FIG. 6, upon execution of the NOx reducing method, first at a time point t1, the first valve 12a is fully closed, and the second valve 12b is fully opened. Then the flow rate of the exhaust gas in the first branch passage 10a is sharply decreased to substantially zero. The exhaust gas that has been flowing through the first branch passage 10a is directed to flow through the second branch passage 10b. Accordingly the flow rate of the exhaust gas that flows through the second branch passage 10b is increased to reach substantially a maximum value in the operation state of the engine at that time. The sum of the flow rates of the exhaust gas flowing through the first and the second branch passages 10a and 10b is substantially defined by the operation state of the engine 1. Therefore, the ratio of the exhaust gas flow rate in the first branch passage 10a to the sum of the flow rates of the exhaust gas flowing through the first and the second branch passages 10a, 10b is minimized. The ratio of the flow rate of the exhaust gas in the second branch passage 10b to the sum of the flow rates of the exhaust gas flowing through those two branch passages is maximized.

At a time point t2 at which each flow rate of the exhaust gas in the first and the second branch passages 10a, 10b is stabilized, the first valve 12a is fully opened, and the second valve 12b is fully closed. Then almost all the exhaust gas that has been flowing through the second branch passage 10b at substantially the maximum flow rate is introduced into the first branch passage 10a. Accordingly the flow rate of the exhaust gas in the first branch passage 10a sharply increases from substantially zero to the substantially maximum value. Conversely the flow rate of the exhaust gas in the second branch passage 10b sharply decreases from substantially the maximum value to substantially zero.

During the period from the time point t2 at which the sharp change in the exhaust gas flow rate occurs to the time point t3 at which the sharp change substantially stops, the first and the second fuel supply valves 14a, 14b are opened such that the fuel as the reducing agent is added to the exhaust gas flowing through the first and the second branch passages 10a, 10b, respectively. Then at a time point t4 at which the flow rate of the exhaust gas in the first and the second branch passages 10a, 10b is stabilized again, the first valve 12a is fully closed again, and the second valve 12b is fully opened. Accordingly almost all the exhaust gas that has been flowing through the first branch passage 10a at the substantially maximum flow rate is introduced into the second branch passage 10b. The flow rate of the exhaust gas in the second branch passage 10b, thus, sharply increases from substantially zero to the substantially maximum value. Conversely the flow rate of the exhaust gas in the first branch passage 10a sharply decreases from the substantially maximum value to substantially zero.

During the period from the time point t4 at which the sharp change in the exhaust gas flow rate occurs to the time point t5 at which the sharp change in the exhaust gas flow rate substantially stops, the first and the second fuel supply valves 14a, 14b are opened such that the fuel as the reducing agent is added to the exhaust gas in the first and the second branch passages 10a, 10b.

In this embodiment, upon execution of the NOx reducing method, the first valve 12a is fully closed, and the second valve 12b is fully opened such that the flow rate of the exhaust gas in the first branch passage 10a becomes substantially zero, and the flow rate of the exhaust gas in the second branch passage 10b becomes substantially maximum. In the aforementioned state, the first valve 12a is fully opened, and the second valve 12b is fully closed such that the flow rate of the exhaust gas in the first branch passage 10a is increased from substantially zero to the substantially maximum value, and the flow rate of the exhaust gas in the second branch passage 10b is sharply decreased from the substantially maximum value to substantially zero.

In the course of the change in the flow rate of the exhaust gas in the respective branch passages as aforementioned, the fuel is supplied as the reducing agent from the first and the second fuel supply valves 14a, 14b, respectively. This makes it possible to distribute the fuel added at the timing at which the flow rate of the exhaust gas is approximately the maximum value to the downstream portion of the first and the second filters 11a, 11b. When the fuel is added at a timing when the flow rate of the exhaust gas decreases, for example, the flow rate becomes half the maximum value or less, the fuel is in contact with the exhaust gas, which is hardly consumed through oxidation. Accordingly, the fuel may be distributed to the upstream portion of the first and the second filters 11a, 11b efficiently.

This makes it possible to distribute the fuel supplied from the first and the second fuel supply valves 14a, 14b over the whole areas of the first and the second filters 11a, 11b as well as reduce the fuel that is unnecessarily consumed through oxidation, thus improving the fuel efficiency.

Under the NOx reducing method shown in the time chart of FIG. 6, the state where all the exhaust gas discharged from the engine is introduced to one of two branch passages by the exhaust gas flow control unit is changed to the state where all the exhaust gas discharged from the engine is introduced to the other branch passage, and the fuel as the reducing agent is supplied by the reducing agent supply means upstream of the NOx catalyst to which the fuel is supplied.

Figure 7:
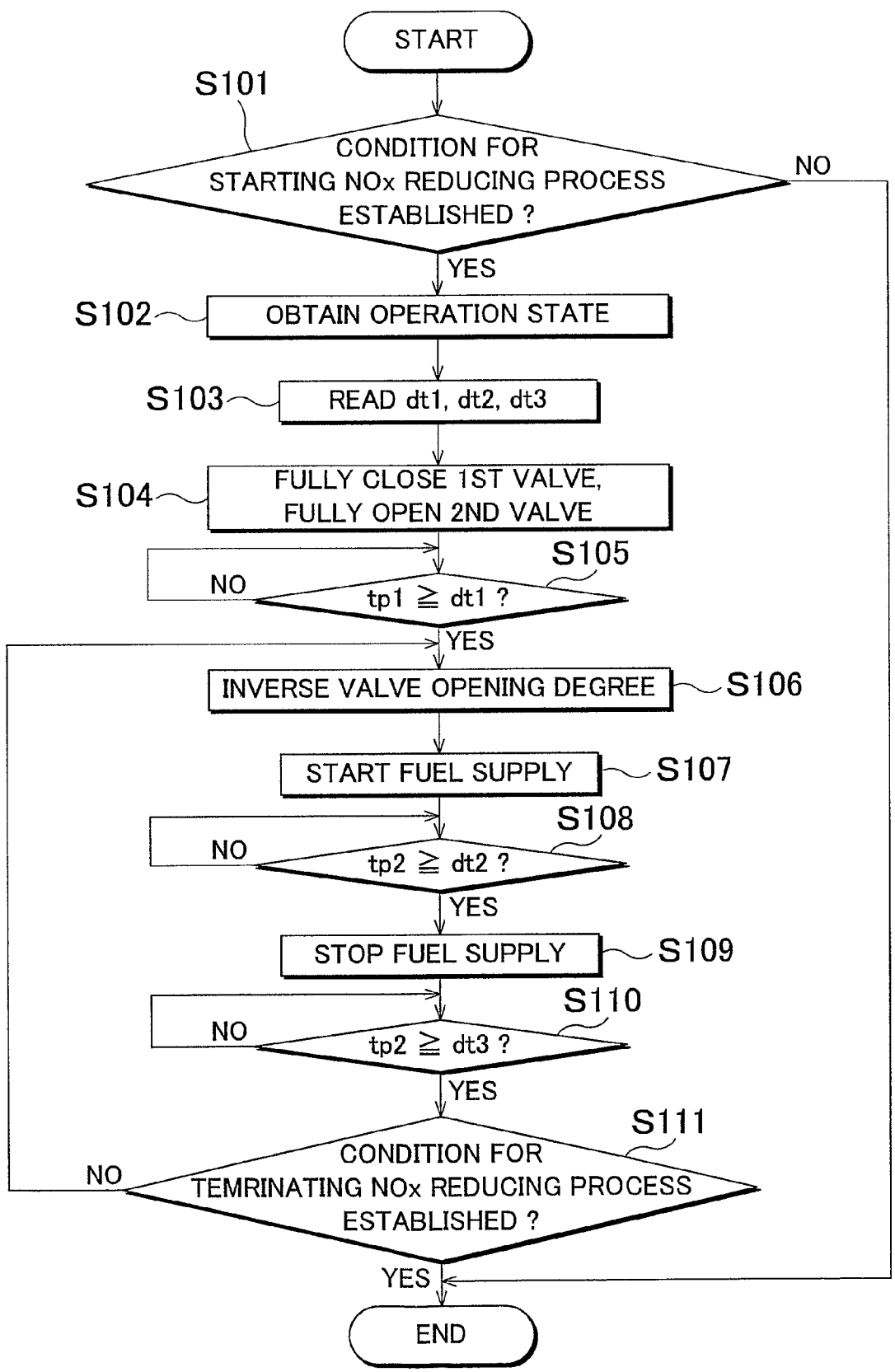
FIG. 7 is a flowchart representing a control routine of the NOx reducing method according to the third embodiment of the invention.

The NOx reducing method in the embodiment will be described in detail referring to FIG. 7. FIG. 7 is a flowchart that represents the control routine for the NOx reducing method according to the embodiment. The routine is a program that is stored in the ROM of the ECU 35, which is executed at a predetermined time interval during the operation of the engine 1.

Upon start of the control routine, in S101, it is determined whether the condition for starting the NOx reducing method has been established. Such condition may be determined as being established when the running distance of the vehicle or the running period of the vehicle from termination of the previous NOx reducing method exceeds a predetermined value. Alternatively it may be determined as being established when the NOx concentration of the exhaust gas downstream of the filter, which has been detected exceeds a predetermined value. If NO is obtained in S101, that is, it is determined that the condition for starting the NOx reducing method has not been established, the control routine ends. Meanwhile if YES is obtained in S101, that is, it is determined that the condition has been established, the method proceeds to S102.

In S102, the operation state of the engine 1 is obtained. More specifically, an engine speed may be derived from an output of a crank position sensor (not shown), or an engine load may be derived from an output signal of an accelerator position sensor (not shown). The method then proceeds from S102 to S103.

In 103, reference time periods dt1, dt3 required for inversing the opening degrees of the first valve 12a and the second valve 12b, respectively, and a reference time period dt2 required for supplying the fuel from the first and the second fuel supply valves 14a, 14b are read upon execution of the exhaust gas flow rate inverse control (described later). They are obtained to cope with each change in the time required for inversing the opening degrees of the first and the second valves 12a, 12b, and the time required for supplying the fuel from the first and the second fuel supply valves 14a, 14b depending on the operation state of the engine 1 which influences the flow rate of the exhaust gas discharged therefrom. The relationship of the operation state of the engine 1 to the reference time periods dt1, dt2, and dt3 has been preliminarily stored in the form of a map. The reference time periods dt1, dt2, dt3 corresponding to the operation state of the engine 1 may be read from the map.

In S104, the first valve 12a is fully closed, and the second valve 12b is fully opened. This may sharply decrease the flow rate of the exhaust gas in the first branch passage 10a to substantially zero. Meanwhile, the flow rate of the exhaust gas in the second branch passage 10b sharply increases to substantially a maximum value. The timing at which step 104 is executed corresponds to the time point t1 in the time chart of FIG. 6. In S104, the timer for counting the elapse of time subsequent to the time point t1 is activated.

The method proceeds to S105 where it is determined whether the time tp1 elapsing from the time point t1 is equal to or longer than the reference time period dt1. The reference time period dt1 is set as the value read in S103, based on which the opening degrees of the first and the second valves 12a, 12b are inversed. It may be set as the time period taken for the flow of the exhaust gas in the first and the second branch passages 10a, 10b to be stabilized after execution of the control of the first and the second valves 12a, 12b in S104. The reference time period dt1 corresponds to the length of time from the time point t1 to the time point t2 shown in the time chart of FIG. 6. If it is determined that the elapsed time tp1 is shorter than the reference time period dt1, the method returns to S105 where it is determined whether the elapsed time tp1 is equal to or longer than the reference time period dt1. The execution of S105 will be continued until it is determined that the elapsed time tp1 is equal to or longer than the reference time period dt1. If it is determined that the elapsed time tp1 is equal to or longer than the reference time period dt1 in S105, the method proceeds to S106.

In step S106, the opening degrees of the first and the second valves 12a, 12b are inversed, that is, the first valve 12a is fully opened, and the second valve 12b is fully closed. As a result, the flow rate of the exhaust gas flowing through the first branch passage 10a is sharply increased from substantially zero to substantially the maximum value. The execution of the control in S106 corresponds to the exhaust gas flow rate inverse control in this embodiment. The timing at which the execution of S106 starts corresponds to the time point t2 shown in the time chart of FIG. 6. Under the method of S106, the timer for counting the time elapsing from the time point t2 is activated. The method then proceeds to S107.

In S107, the fuel is supplied from the first and the second fuel supply valves 14a, 14b to the exhaust gas flowing through the first and the second branch passages 10a, 10b, respectively. The fuel supplied from the first fuel supply valve 14a is carried by the exhaust gas at a relatively low flow rate to reach the first filter 11a. In this case, the rate of fuel consumption in contact with the exhaust gas through oxidization is small, resulting in efficient supply of the fuel to the first filter 11a. Then the flow rate of the exhaust gas flowing through the first branch passage 10a is sharply increased. Accordingly the amount of the fuel consumed through oxidization until it reaches the first filter 11a is increased. This makes sure to distribute the fuel to the downstream portion of the first filter 11a although the efficiency is deteriorated.

Meanwhile the fuel supplied from the second fuel supply valve 14b is carried by the exhaust gas at the higher flow rate. The amount of the fuel consumed through oxidization until it reaches the second filter 11b becomes large. This makes sure to distribute the fuel to the downstream portion of the second filter 11b although the efficiency is deteriorated. The flow rate of the exhaust gas flowing through the second branch passage 10b is sharply decreased thereafter. This may reduce the rate of the fuel consumed through oxidization in contact with the exhaust gas, thus efficiently supplying the fuel to the second filter 11b.

The method then proceeds to S108 where it is determined whether the time tp2 elapsing from the time point t2 is equal to or longer than the reference time period dt2. The reference time period dt2 is set as the reference value, based on which the fuel supply from the first and the second fuel supply valves 14a, 14b is stopped. That is, the reference time period dt2 is set as being taken until the sharp change in the flow rate of the exhaust gas in the first and the second branch passages 10a, 10b is substantially stopped. The reference time period dt2 corresponds to the period from the time point t2 to the time point t3 shown in the time chart of FIG. 6. If it is determined that the elapsed time tp2 is shorter than the reference time period dt2, the method returns to S108 where it is determined whether the time elapsing from the time point t2 is equal to or longer than the reference time period dt2. The execution in S108 will be continued until it is determined that the elapsed time tp2 from the time point t2 is equal to or longer than the reference time period dt2. Meanwhile, if it is determined that the elapsed time tp2 is equal to or longer than the reference time dt2, the method proceeds to S109.

In step S109, the fuel supply from the first and the second fuel supply valves 14a and 14b is stopped, and the method proceeds to S110.

In step S110, it is determined whether the time tp2 elapsing from the time point t2 is equal to or longer than the reference time period dt3. The reference time period dt3 is set as the reference period taken from the operation control of the first and the second valves 12a, 12b to the inversion of the opened/closed states thereof. It may be set as the period taken until the flow rates of the exhaust gas in the first and the second branch passages 10a, 10b after execution of the exhaust gas flow rate inverse control are stabilized. The reference time period dt3 corresponds to the period from the time point t2 to the time point t4 shown in the time chart of FIG. 6. The reference time period dt3 is considered to be almost twice the reference time period dt1.

If it is determined that the elapsed time tp2 is shorter than the reference time period dt3, the method returns to S110 where it is determined whether the time tp2 elapsing from the time point t2 is equal to or longer than the reference time period dt3. The aforementioned determination will be continued until it is determined that the elapsed time tp2 from the time point t2 becomes equal to or longer than the reference time period dt3. Meanwhile if it is determined in S110 that the elapsed time tp2 is equal to or longer than the reference time period dt3, the method proceeds to S111.

In S111, it is determined whether the condition for terminating the NOx reducing method has been established. The condition for terminating the NOx reducing method is considered to be established when the frequency of execution of the exhaust gas flow rate inverse control method or the sum of the time periods taken for the fuel supply from the first and the second fuel supply valves 14a and 14b exceed the predetermined value. It may be considered to be established when the time taken for executing the NOx reducing method exceeds the predetermined time. Alternatively it may be considered to be established when the NOx concentration of the exhaust gas at the downstream portion of the filter, which has been detected becomes equal to or lower than the predetermined value. If it is determined that the condition for terminating NOx reducing method has been established, the routine ends. Meanwhile if it is determined that the condition for terminating NOx reducing method has not been established, the method returns to S106 where the exhaust gas flow rate inverse control is executed again.

Assuming that the condition for terminating the NOx reducing method is considered to be established when the exhaust flow rate inverse control is executed twice, the routine is expected to be terminated at the time point t5 shown in the time chart of FIG. 6. Assuming that such condition is considered to be established when the time taken for executing the NOx reducing method has exceeded the predetermined time, the exhaust gas flow rate inverse control will be repeatedly executed for a predetermined period of time.

In the embodiment as described above, under the exhaust gas flow rate inverse control, the time period for which the flow rates of the exhaust gas flowing through the first and the second branch passages 10a, 10b sharply change, that is, between the time points t2 and t3 or time points t4 and t5, the fuel supply from the first and the second fuel supply valves 14a, 14b is continued. The fuel does not have to be continuously supplied for the entire time period between the time points t2 and t3 or the time points t4 and t5, but may be supplied for a part of the aforementioned time period. Alternatively the fuel supply for a short period may be executed by a plurality of times. This makes it possible to allow the fuel as the reducing agent to be easily carried by the exhaust gas, resulting in improved dispersibility of the fuel. Additionally the fuel may be supplied for the period between not only the time points t2 and t3 or time points t4 and t5, but also for the longer period including the time period between the time points t2 and t3 or the time points t4 and t5 so as to provide the effects of the invention.

In the embodiment, the fuel as the reducing agent is supplied from both the first and the second fuel supply valves 14a and 14b at every execution of the exhaust gas flow rate inverse control. However, the fuel supply may be executed from one of those first and the second fuel supply valves 14a and 14b.

In the embodiment, each operation state of the first and the second valves 12a and 12b is changed from the fully opened state to the fully closed state or from the fully closed state to the fully opened state, respectively at every execution of the exhaust gas flow rate inverse control. Under the exhaust gas flow rate inverse control, each state of the exhaust gas flow control valve does not have to be controlled between the fully closed state and the fully opened state. The exhaust gas flow control valve may be controlled between the intermediate stages, for example, between the state where the opening degree is relatively larger and the state where the opening degree is relatively smaller.

In the embodiment, each of the branch passages is provided with a filter. The number of the filter provided in the branch passage may be arbitrarily set. That is, a plurality of filters arranged in series may be provided in each of the branch passages. In this case, the fuel is supplied from the fuel supply valve at a timing when the flow rate of the exhaust gas is approximately the maximum value such that the fuel as the reducing agent is allowed to reach the filter at the downstream side of those arranged in series.

The exhaust gas flow control means includes the first and the second valves 12a, 12b each provided in the respective branch passages. For example, the exhaust gas flow control means may be structured by providing one control valve at a joint portion between the first exhaust pipe 5a and the first/second branch passages 10a, 10b, which is capable of controlling the ratio of the flow rate of the exhaust gas flowing through the first exhaust pipe 5a to the flow rate of the exhaust gas to be introduced into the first and the second branch passages 10a and 10b, respectively.

Fourth Embodiment

A fourth embodiment of the invention will be described. In this embodiment, in a time period for which the flow rates of the exhaust gas flowing through the first and the second branch passages 10a and 10b sharply change, each amount of the fuel supplied from the first and the second fuel supply valves 14a and 14b is changed by the flow rate of the exhaust gas under the exhaust gas flow rate inverse control.

Figure 8:
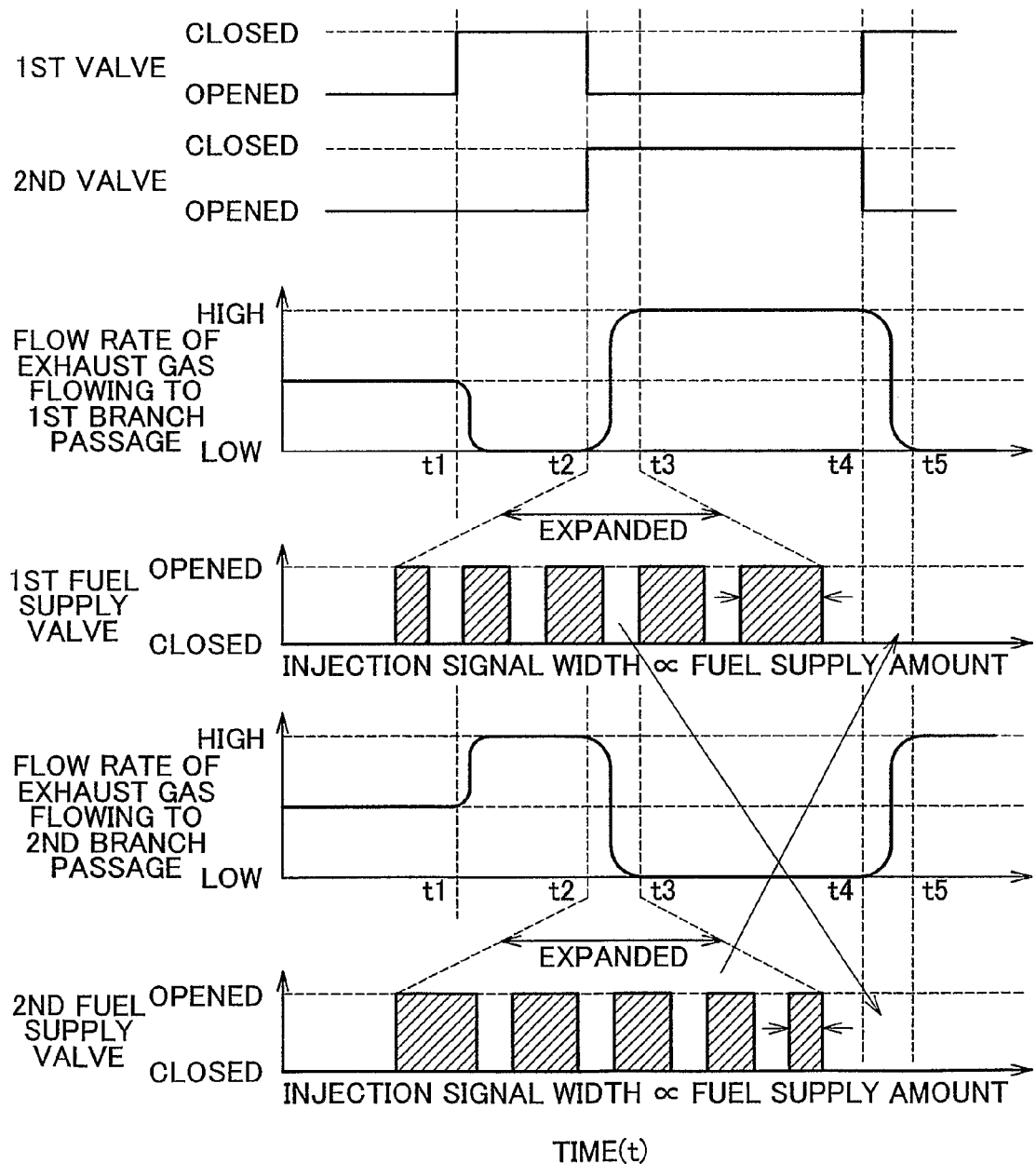
FIG. 8 is a time chart showing an operation of each of the exhaust gas flow rate control valves under the NOx reducing method, resultant changes in the respective flow rates of the exhaust gas flowing through the respective branch passages, and operations of the respective fuel supply valves according to the fourth embodiment of the invention.

FIG. 8 is a time chart that represents operations of the respective exhaust gas flow control valves under the NOx reducing method, the change in the flow rate of the exhaust gas each flowing through the respective branch passages accompanied with the operation of the exhaust gas flow control valve, and operations of the flow control valves, respectively. The horizontal axis of the time chart shown in FIG. 8 represents time. As the operation of the respective exhaust gas flow control valve is the same as that shown in the time chart of FIG. 6, the explanation will be omitted. The time chart of FIG. 8 shows characteristics of the operation controls of the first and the second fuel supply valves 14a and 14b.

More specifically, at the time point t2, the first valve 12a is fully opened, and the second valve 12b is fully closed. Then the flow rate of the exhaust gas in the first branch passage 10a sharply increases from substantially zero to substantially the maximum value. Accompanied with the aforementioned increase in the flow rate, the control is executed such that the amount of the fuel supplied from the first fuel supply valve 14a is increased.

For the time period between the time points t2 and t3, the control is executed by opening and closing the first fuel supply valve 14a pulse-wise so as to gradually increase the valve opening period. Accordingly for the period for which the flow rate of the exhaust gas is high, more fuel may be supplied. Even if the amount of the fuel consumed by oxidation in contact with the exhaust gas is increased, sufficient amount of the fuel is allowed to be distributed to the downstream portion of the first filter 11a, thus supplying the fuel to the whole area of the first filter 11a. For the time period for which the flow rate of the exhaust gas is low, the amount of the supplied fuel is small. When the amount of the fuel consumed by oxidation in contact with the exhaust gas is small, the fuel efficiency may be improved without supplying excessive amount of the fuel.

Meanwhile, for the time period between the time points t2 and t3, the control is executed by opening and closing the second fuel supply valve 14b pulse-wise so as to gradually reduce the valve opening period. For the period for which the flow rate of the exhaust gas is high, more fuel may be supplied to the exhaust gas. Even if the amount of the fuel consumed by oxidation in contact with the exhaust gas is increased, sufficient amount of the fuel is allowed to be distributed to the downstream portion of the second filter 11b, thus supplying the fuel over the whole area of the second filter 11b. For the time period for which the flow rate of the exhaust gas is low, the amount of the supplied fuel is small. When the amount of the fuel consumed by oxidation in contact with the exhaust gas is small, the fuel efficiency may be improved without supplying excessive amount of the fuel.

For the time period between the time points t4 and t5, the operations of the first and the second fuel supply valves 14a and 14b are inversed, and the same control as described above is executed. For the time period between the time points t2 and t3 of the time chart of FIG. 8, the fuel supply from the first and the second fuel supply valves 14a and 14b is executed in 5 pulses, respectively. The number of such pulse is not limited to 5, but may be set to an arbitrary value so long as it is equal to or more than 2.

In the aforementioned explanation, the internal combustion engine 1 is a diesel engine. However, it may be a gasoline engine.

In the embodiment, the first and the second filters 11a, 11b are subjected to the NOx reducing method (including S-poisoning eliminating method). The same control may be applied to the PM recovery method (method for recovering the capability of trapping the particulate matters) so as to increase each temperature of the respective filters. In this case, the fuel as the reducing agent may be supplied to the oxidizing catalyst rather than the NOx catalyst provided upstream of the filter.

In the embodiment, the fuel as the reducing agent is supplied to the occlusion/reduction type NOx catalyst so as to perform the NOx reducing method. However, the invention is applicable to the selective reduction type NOx catalytic system in which ureic water as the reducing agent is supplied into the exhaust passage so as to reduce the NOx contained in the exhaust gas.

The invention claimed is:

1. An exhaust emission control system of an internal combustion engine, comprising:
   an exhaust passage having one end connected to the internal combustion engine, through which exhaust gas discharged from the internal combustion engine flows;
   an exhaust gas flow control unit that controls a flow rate of the exhaust gas that flows through the exhaust passage;
   a NOx catalyst provided in the exhaust passage for purifying NOx contained in the exhaust gas; and
   a reducing agent supply device that supplies a reducing agent to the exhaust gas that flows through the exhaust passage by at least one discharging operation of the reducing agent under a rich spike control in which an air/fuel ratio of the exhaust gas is temporarily brought into a rich state,
   wherein the exhaust gas flow control unit changes the flow rate of the exhaust gas that flows through the exhaust passage when the reducing agent is to be supplied to the NOx catalyst so as to reduce one of the NOx and SOx on the NOx catalyst,
   wherein the reducing agent supply device supplies the reducing agent to the exhaust passage at a plurality of timings at which the exhaust gas flows at different flow rates during a time period from a timing at which a fully closing command for a valve in the exhaust passage is issued, to a timing at which the flow rate of the exhaust gas changes to substantially zero in response to the command,
   and wherein each of the timings at which the reducing agent is supplied occurs at a different exhaust gas flow rate.

2. The exhaust emission control system according to claim 1, wherein the timing for supplying the reducing agent from the reducing agent supply device is determined in accordance with a portion at which one of the NOx and the SOx is reduced on the NOx catalyst, and an amount of the reducing agent supplied from the reducing agent supply device is determined in accordance with a reduction level required for the portion at which one of the NOx and the SOx is reduced on the NOx catalyst.

3. The exhaust emission control system according to claim 2, wherein the NOx catalyst comprises a group of a plurality of NOx catalysts, and the portion at which one of the NOx and the SOx is reduced on the NOx catalyst is determined for at least one of the plurality of NOx catalysts.

4. The exhaust emission control system according to claim 2, wherein
   the exhaust passage is divided halfway into two branch passages, and the exhaust gas flow control unit controls the flow rate of the exhaust gas that flows through the two branch passages;
   each of the two branch passages is provided with at least one NOx catalyst, respectively;
   the reducing agent supply device is provided at each portion of the two branch passages upstream of the NOx catalysts, respectively;
   the exhaust gas flow control unit decreases the flow rate of the exhaust gas in one of the two branch passages, which is provided with the NOx catalyst having one of the NOx and the SOx required to be reduced to a value of approximately zero when the reducing agent is to be supplied to the NOx catalyst to reduce one of the NOx and the SOx thereon; and
   a timing at which the reducing agent is supplied from the reducing agent supply device is determined such that the reducing agent supplied from the reducing agent supply device reaches a portion at which one of the NOx and the SOx is reduced on the NOx catalyst when the flow rate of the exhaust gas that flows through the one of the two branch passages which is provided with the Nox catalyst becomes approximately zero.

5. The exhaust emission control system according to claim 1, wherein
   the exhaust passage is divided halfway into two branch passages, and the exhaust gas flow control unit controls the flow rate of the exhaust gas that flows through each of the two branch passages;
   at least one NOx catalyst is provided in each of the two branch passages, respectively;
   the reducing agent supply device is provided in each of the two branch passages upstream of the NOx catalysts;
   the exhaust gas flow control unit executes an exhaust gas flow rate inverse control under which a state where a flow rate of the exhaust gas in one of the two branch passages is higher than that of the exhaust gas in the other branch passage is changed to a state where the higher flow rate of the exhaust gas in the one of the two branch passages is decreased and the flow rate of the exhaust gas in the other branch passage is increased when the reducing agent is to be supplied to the NOx catalyst to which the reducing agent is required so as to reduce one of the NOx and SOx on the NOx catalyst; and the reducing agent supply device supplies the reducing agent during a timing at which the change in the flow rate of the exhaust gas occurs under the exhaust gas flow rate inverse control executed by the exhaust gas flow control unit.

6. The exhaust emission control system according to claim 5, wherein under the exhaust gas flow rate inverse control, the exhaust gas flow control unit changes a state where a ratio of the flow rate of the exhaust gas in the one of the two branch passages to the total flow rates of the exhaust gas in the two branch passages takes a maximum value, and the ratio of the flow rate of the exhaust gas in the other branch passage to the total flow rates takes a minimum value to a state where the ratio that takes the maximum value is minimized, and the ratio that takes the minimum value is maximized.

7. The exhaust emission control system according to claim 6, wherein the exhaust gas flow control unit includes an exhaust gas flow control valve in each of the two branch passages, and under the exhaust gas flow rate inverse control, the exhaust gas flow control unit changes a state where the exhaust gas flow control valve in the one of the two branch passages is fully opened, and the exhaust gas flow control valve in the other branch passage is fully closed to a state where the exhaust gas flow control valve that has been fully opened is fully closed, and the exhaust gas flow control valve that has been fully closed is fully opened.

8. The exhaust emission control system according to claim 5, wherein the reducing agent is supplied from each of the reducing agent supply device in the two branch passages to the NOx catalysts downstream of the reducing agent supply device for reducing one of the NOx and the SOx on the NOx catalysts.

9. The exhaust emission control system according to claim 5, wherein the exhaust gas flow control unit executes the exhaust gas flow rate inverse control repeatedly for a predetermined period, and the reducing agent is supplied from the reducing agent supply device to a portion upstream of the NOx catalyst to which the reducing agent is required to be supplied under the exhaust gas flow rate inverse control.

10. The exhaust emission control system according to claim 5, wherein under the exhaust gas flow rate inverse control, the reducing agent supply device in each of the branch passages decreases an amount of the reducing agent supplied from the reducing agent supply device as the flow rates of the exhaust gas in the branch passages decrease, and increases the amount of the reducing agent supplied from the reducing agent supply device as the flow rates of the exhaust gas in the branch passages increase.

11. A purification capacity recovery method of an exhaust emission control system that includes an exhaust passage which has one end connected to an internal combustion engine, through which exhaust gas discharged from the internal combustion engine flows, and a NOx catalyst provided in the exhaust passage for purifying NOx contained in the exhaust gas, the method comprising the ste of:

changing the flow rate of the exhaust gas that flows through the exhaust passage; and supplying a reducing agent to the exhaust gas that flows through the exhaust passage by at least one discharging operation of the reducing agent under a rich spike control in which an air/fuel ratio of the exhaust gas is temporarily brought into a rich state so as to reduce one of the NOx and SOx on the NOx catalyst, wherein the reducing agent is supplied to the exhaust passage at a plurality of timings at which the exhaust gas flows at different flow rates during a time period from a timing at which a fully closing command for a valve in the exhaust passage is issued, to a timing at which the flow rate of the exhaust gas changes to substantially zero in response to the command, and each of the timings at which the reducing agent is supplied occurs at a different exhaust gas flow rate.

12. The purification capacity recovery method according to claim 11, wherein the plurality of timings at which the reducing agent is supplied to the exhaust gas that flows through the exhaust passage comprises two timings including a first timing at which the flow rate of the exhaust gas that flows through the exhaust passage, which is provided with the NOx catalyst to which the reducing agent is required to be supplied becomes a predetermined first flow rate, and a second timing at which the flow rate of the exhaust gas that flows through the exhaust gas passage, which is provided with the NOx catalyst to which the reducing agent is required to be supplied becomes a predetermined second flow rate;

when the flow rate of the exhaust gas that flows through the exhaust passage, which is provided with the NOx catalyst to which the reducing agent is required to be supplied becomes the first flow rate, a predetermined first reducing amount of the reducing agent is supplied to the exhaust gas that flows through the exhaust passage;

when the flow rate of the exhaust gas that flows through the exhaust passage, which is provided with the NOx catalyst to which the reducing agent is required to be supplied becomes the second flow rate, a predetermined second reducing amount of the reducing agent is supplied to the exhaust gas that flows through the exhaust passage;

the first and the second flow rates of the exhaust gas are determined in accordance with a portion at which one of the NOx and the SOx is required to be reduced on the NOx catalyst; and the first and the second reducing agent amounts are determined in accordance with a reduction level required to the portion at which one of the NOx and the SOx is required to be reduced on the NOx catalyst.

13. The purification capacity recovery method according to claim 12, wherein the NOx catalyst comprises a group of a plurality of NOx catalysts, and the portion at which one of the NOx and the SOx is required to be reduced on the NOx catalyst is determined for at least one of the plurality of NOx catalysts.

14. The purification capacity recovery method according to claim 11, wherein the exhaust passage is divided halfway into two branch passages, the method further comprising the following steps:

changing a state where the exhaust gas discharged from the internal combustion engine at a whole flow rate flows through one of the two branch passages to a state where the exhaust gas discharged from the internal combustion engine at the whole flow rate flows through the other branch passage; and supplying the reducing agent upstream of the NOx catalyst to which the reducing agent is required to be supplied so as to reduce one of the NOx and the SOx on the NOx catalyst.

15. The purification capacity recovery method according to claim 14, wherein the amount of the reducing agent supplied to the exhaust gas that flows through the other branch passage, to which the reducing agent is supplied, is decreased as the flow rate of the exhaust gas that flows through the other branch passage decreases.

16. A purification capacity recovery method of an exhaust emission control system that includes an exhaust passage which has one end connected to an internal combustion engine, which is divided halfway into two branch passages, through which exhaust gas discharged from the internal combustion engine flows, and a NOx catalyst provided for each of the two branch passages for purifying NOx contained in the exhaust gas, the method comprising the steps of:

executing an exhaust gas flow rate inverse control under which a state where a flow rate of the exhaust gas in one of the two branch passages is higher than that of the exhaust gas in the other branch passage is changed to a state where the higher flow rate of the exhaust gas in the one of the two branch passages is decreased and a flow rate of the exhaust gas in the other branch passage is increased; and supplying a reducing agent upstream of the NOx catalyst to which the reducing agent is required so as to reduce one of the NOx and SOx on the NOx catalyst, wherein the reducing agent is supplied at a plurality of timings at which the exhaust gas flows at different flow rates during a time period at which the change in the flow rate of the exhaust gas occurs under the exhaust gas flow rate inverse control, and each of the timings at which the reducing agent is supplied occurs at a different exhaust gas flow rate.

17. An exhaust emission control system for an internal combustion engine, comprising:

an exhaust passage having one end connected to the internal combustion engine, which is divided halfway into two branch passages, and admits a flow of exhaust gas discharged from the internal combustion engine;

an exhaust gas flow control unit that controls the flow rate of the exhaust gas that flows through the two branch passages;

at least one NOx catalyst provided for each of the two branch passages for purifying NOx contained in the exhaust gas; and a reducing agent supply device provided in each of the two branch passages upstream of the NOx catalysts for supplying a reducing agent to the exhaust gas that flows through the two branch passages, wherein the exhaust gas flow control unit executes an exhaust gas flow rate inverse control under which a state where a flow rate of the exhaust gas in one of the two branch passages is higher than that of the exhaust gas in the other branch passage is changed to a state where the higher flow rate of the exhaust gas in the one of the two branch passages is decreased and the flow rate of the exhaust gas in the other branch passage is increased when the reducing agent is to be supplied to the NOx catalyst to which the reducing agent is required so as to reduce one of the NOx and SOx on the NOx catalyst, wherein the reducing agent supply device supplies the reducing agent at a plurality of timings at which the exhaust gas flows at different flow rates during a time period at which the change in the flow rate of the exhaust gas occurs under the exhaust gas flow rate inverse control executed by the exhaust gas flow control unit, and wherein each of the timings at which the reducing agent is supplied occurs at a different exhaust gas flow rate.

18. The exhaust emission control system according to claim 17, wherein under the exhaust gas flow rate inverse control, the exhaust gas flow control unit changes a state where a ratio of the flow rate of the exhaust gas in the one of the two branch passages to the total flow rates of the exhaust gas in the two branch passages takes a maximum value, and the ratio of the flow rate of the exhaust gas in the other branch passage to the total flow rates takes a minimum value to a state where the ratio that takes the maximum value is minimized, and the ratio that takes the minimum value is maximized.

19. The exhaust emission control system according to claim 17, wherein the exhaust gas flow control unit includes an exhaust gas flow control valve in each of the two branch passages, and under the exhaust gas flow rate inverse control, the exhaust gas flow control unit changes a state where the exhaust gas flow control valve in the one of the two branch passages is fully opened, and the exhaust gas flow control valve in the other branch passage is fully closed to a state where the exhaust gas flow control valve that has been fully opened is fully closed, and the exhaust gas flow control valve that has been fully closed is fully opened.

20. The exhaust emission control system according to claim 17, wherein the reducing agent is supplied from each of the reducing agent supply device in the two branch passages to the NOx catalysts downstream of the reducing agent supply device for reducing one of the NOx and the SOx on the NOx catalysts.

21. The exhaust emission control system according to claim 17, wherein the exhaust gas flow control unit executes the exhaust gas flow rate inverse control repeatedly for a predetermined period, and the reducing agent is supplied from the reducing agent supply device to a portion upstream of the NOx catalyst to which the reducing agent is required to be supplied under the exhaust gas flow rate inverse control.

22. The exhaust emission control system according to claim 17, wherein under the exhaust gas flow rate inverse control, the reducing agent supply device in each of the branch passages decreases an amount of the reducing agent supplied from the reducing agent supply device as the flow rates of the exhaust gas in the branch passages decrease, and increases the amount of the reducing agent supplied from the reducing agent supply device as the flow rates of the exhaust gas in the branch passages increase.

* * * * *